United States Patent
Kawase et al.

(10) Patent No.: US 8,279,930 B2
(45) Date of Patent: Oct. 2, 2012

(54) IMAGE PROCESSING APPARATUS AND METHOD, PROGRAM, AND RECORDING MEDIUM

(75) Inventors: Tomonori Kawase, Tokyo (JP); Takafumi Morifuji, Tokyo (JP); Kunio Kawaguchi, Kanagawa (JP)

(73) Assignee: Sony Corporation (JP)

( * ) Notice: Subject to any disclaimer, the term of this patent is extended or adjusted under 35 U.S.C. 154(b) by 880 days.

(21) Appl. No.: 12/378,733

(22) Filed: Feb. 19, 2009

(65) Prior Publication Data

US 2009/0213937 A1    Aug. 27, 2009

(30) Foreign Application Priority Data

Feb. 21, 2008   (JP) .................................. 2008-039539

(51) Int. Cl.
*H04N 7/26*   (2006.01)
(52) U.S. Cl. ............... 375/240.16; 375/240.12; 382/275
(58) Field of Classification Search .............. 375/240.16
See application file for complete search history.

(56) References Cited

U.S. PATENT DOCUMENTS

| | | | | |
|---|---|---|---|---|
| 5,508,747 | A | * | 4/1996 | Lee ................................ 348/441 |
| 7,142,600 | B1 | * | 11/2006 | Schonfeld et al. ........ 375/240.16 |
| 2005/0271144 | A1 | * | 12/2005 | Yoshiwara ............... 375/240.16 |
| 2009/0231314 | A1 | * | 9/2009 | Hanaoka et al. .............. 345/208 |

FOREIGN PATENT DOCUMENTS

| | | |
|---|---|---|
| JP | 09214899 A | 8/1997 |
| JP | 2005204066 A | 7/2005 |
| JP | 2007-074588 A | 3/2007 |
| JP | 2007336235 A | 12/2007 |

OTHER PUBLICATIONS

Grammalidis et al., "Temporal Frame Interpolation for Stereoscopic Sequences Detection Using Object-Based Motion Estimation and Occlusion", 1995, IEEE, pp. 382-385.*
Office Action from Japanese Application No. 2008-039539, dated Apr. 24, 2012.

* cited by examiner

*Primary Examiner* — Matthew Smithers
(74) *Attorney, Agent, or Firm* — Lerner, David, Littenberg, Krumholz & Mentlik, LLP

(57) ABSTRACT

A compensation allocation unit performs allocation compensation of a motion vector to a pixel to which a motion vector is not allocated by a victor allocation unit. A C/UC area determination unit compares magnitudes of a present DFD, a past DFD, and a future DFD based on a background vector and a DFD based on a compensation allocation vector by an evaluation value calculation unit to determine an area of a target pixel. Regarding the target pixel determined as the pixel in a covered area or an uncovered area, an interpolation method decision unit decides a computation method for a pixel value through which one of a double-sided interpolation and a one-sided interpolation. An interpolation frame generation unit computes the target pixel of the pixel value of the interpolation frame through the method decided by the interpolation method decision unit.

8 Claims, 19 Drawing Sheets

United States Patent US 8,279,930 B2

IMAGE PROCESSING APPARATUS AND METHOD, PROGRAM, AND RECORDING MEDIUM

CROSS REFERENCES TO RELATED APPLICATIONS

The present application claims priority from Japanese Patent Application No. JP 2008-039539, filed in the Japanese Patent Office on Feb. 21, 2008, the entire content of which is incorporated herein by reference.

BACKGROUND OF THE INVENTION

1. Field of the Invention

The present invention relates to an image processing apparatus and method, a program, and a recording medium. In particular, the invention relates to an image processing apparatus and method, a program, and a recording medium with which in any area of an image of an interpolation frame, it is possible to appropriately generate a pixel.

2. Description of the Related Art

Up to now, a frame interpolation processing can be performed on a television signal read out from a frame memory on the basis of average motion vector data of a plurality of pieces of motion vector data from a motion vector detection circuit which is configured to detect a motion of the television signal.

Generation of the interpolation frame is performed in the following manner, for example. Intersecting points on a frame at a time t and a frame at a time t+1 which are two frames associated by a motion vector v are set as a point q and a point r. Herein, a value of a pixel p on a frame at a time t+k which is a new frame between the frame at the time t and the frame at the time t+1 is subjected to a linear interpolation by an inverse ratio (1−k):k of a time position from the point q and the point r to calculate Ft+k(p) in the following expression.

$$Ft+k(p)=(1-k)Ft(q)+kFt+1(r)$$

A frame composed of the pixel in which the pixel value is computed in the above-mentioned manner becomes the interpolation frame.

However, for example, in a case where the interpolation frame is generated in a moving image where a background and a foreground have different motions as two animal bodies, between a time t0 and a time t1, depending on areas of the image, motion vectors in different directions are generated. As a result, an area through which the motion vector does not pass is generated at a time of generating the interpolation frame, and it is thus difficult to generate the interpolation frame.

In such a case, up to now, in order to generate the interpolation frame, for example, a vector compensation utilizing a surrounding motion vector or the like is performed. At this time, allocation of the motion vector is performed in such a manner that a sum of absolute differences between two faces (DFD: Displaced Frame Difference) becomes minimum.

The sum of the absolute differences DFD is used, for example, as an evaluation value of the motion amount, and calculated between blocks shifted by a targeted vector amount. In general, as the DFD is smaller, waveforms of the blocks between the frames are matched in a finer manner, and it can be determined that the reliability of the motion vector is high. For example, the sum of the absolute differences DFD is utilized in a case where a plausible vector is chosen from a plurality of candidates and the like.

Also, in order to alleviate an appearance of collapse of the interpolation frame and improve a subjective image quality, such a method has been proposed that the pixel value calculated at the time of the interpolation frame generation is mixed with the pixel value having been subjected to the time interpolation by using a vector having the size of 0 (that is, a vector (0, 0), which will be hereinafter referred to as 0 vector) at a certain ratio (for example, see Japanese Unexamined Patent Application Publication No. 2007-74588). With this configuration, it is possible to obscure the graphical collapse.

SUMMARY OF THE INVENTION

However, in a moving image where a background and a foreground have different motions, a motion vector becomes unstable in an area in the vicinity of a border between the background and the foreground, and it is difficult to obtain a correct motion vector candidate.

Also, along with the elapse of time, in the background area covered by the foreground or in the background area appearing from the back of the foreground, even when the correct motion vector candidate is obtained, it is difficult to appropriately evaluate the DFD between the time t0 and the time t1.

That is, regarding the above-mentioned area, a corresponding area does not exist at the time t0 and the time t1, and as a result, a difference between a texture of the background and a texture of the foreground is computed by using the DFD.

In such an area, it is difficult to select a correct motion vector candidate. Also, it is difficult to generate a pixel of the interpolation frame. For that reason, for example, an edge, which does not originally exist, is generated in the image of the interpolation frame, and a collapse may occur in forms of the image. Furthermore, if such collapses are obviously generated, a user observing the image recognizes that the image quality is deteriorated.

The present invention has been made in view of the above-mentioned circumstances, and it is desirable to appropriately generate a pixel in any area of an image of an interpolation frame.

According to an embodiment of the present invention, there is provided an image processing apparatus configured to generate, on the basis of an image of a first frame of a moving image and an image of a second frame which comes after the first frame in terms of time, an image of an interpolation frame which comes after the first frame in terms of time and comes before the second frame in terms of time, the image processing apparatus including: motion vector allocation means adapted to allocate, on the basis of the image of the first frame and the image of the second frame, a motion vector to a pixel of the interpolation frame; motion vector compensation means adapted to compensate a motion vector of a pixel of the interpolation frame to which the motion vector is not allocated by the motion vector allocation means; area determination means adapted to determine, regarding an area containing a target pixel in the image of the interpolation frame, whether a background displayed in the image of the first frame is a C (Covered) area which is an area covered by a foreground in the second frame, whether the background covered by the foreground in the image of the first frame is a UC (UnCovered) area which is an area displayed in the second frame, or whether the foreground or background displayed in the image of the first frame is a normal area which is an area displayed also in the second frame; and computation method decision means adapted to decide a computation method for a pixel value of the target pixel by computing a plurality of evaluation values for evaluating a reliability of the motion vector allocated to the target pixel by the motion vector allocation means or the motion vector compensation means and comparing magnitudes of the plurality of evaluation values in a case where the area determination means determines that the target pixel is the pixel in the C area or the pixel in the UC area.

The image processing apparatus according to the embodiment of the present invention can further include background vector extraction means adapted to extract a background vector representing a motion of an image of the background of the interpolation frame on the basis of a histogram of the motion vectors allocated to the respective pixels constituting the interpolation frame, in which regarding the target pixel, the area determination can means compute a plurality of evaluation values for evaluating a reliability of a background vector, compute the evaluation values for evaluating the reliability of the motion vector allocated to the target pixel by the motion vector allocation means or the motion vector compensation means, and compute magnitudes of the respective evaluation values to determine the area containing the target pixel.

In the image processing apparatus according to the embodiment of the present invention, the area determination means can identify a pixel of the first frame corresponding to the target pixel in the interpolation frame and a pixel of the second frame corresponding to the target pixel on the basis of the background vector and also identify a pixel of a third frame which comes before the first frame corresponding to the target pixel in the interpolation frame in terms of time and a pixel of a fourth frame which comes after the second frame corresponding to the target pixel in terms of time on the basis of the background vector, compute a DFD between the identified pixel of the first frame and the identified pixel of the second frame to set to be as a present DFD, compute a DFD between the identified pixel of the first frame and the identified pixel of the third frame to set to be as a past DFD, compute a DFD between the identified pixel of the second frame and the identified pixel of the fourth frame to set to be as a future DFD, identify the pixel of the first frame corresponding to the target pixel in the interpolation frame and the pixel of the second frame corresponding to the target pixel on the basis of the compensation vector, compute a DFD between the identified pixel of the first frame and the identified pixel of the second frame to set to be as a DFD of the motion vector allocated to the target pixel, and determine the area containing the target pixel by using the present DFD, the past DFD, and the future DFD of the background vector, and the DFD of the motion vector allocated to the target pixel as the evaluation values.

In the image processing apparatus according to the embodiment of the present invention, the area determination means can determine that the area containing the target pixel is the C area in a case where the past DFD is smallest, determine that the area containing the target pixel is the UC area in a case where the future DFD is smallest, and determine that the area containing the target pixel is the normal area in a case where the present DFD is smallest or the DFD of the motion vector allocated to the target pixel is smallest among the present DFD, the past DFD, and the future DFD of the background vector, and the DFD of the motion vector allocated to the target pixel.

In the image processing apparatus according to the embodiment of the present invention, the computation method decision means can identify the pixel of the first frame corresponding to the target pixel in the interpolation frame, the pixel of the second frame corresponding to the target pixel on the basis of the motion vector allocated to the target pixel and also identify the pixel of the third frame which comes before the first frame corresponding to the target pixel in the interpolation frame in terms of time and the pixel of the fourth frame which comes after the second frame corresponding to the target pixel in terms of time on the basis of the background vector on the basis of the background vector, and further compute the present DFD, the past DFD, and the future DFD as the evaluation values for evaluating the reliability of the motion vector allocated to the target pixel.

In the image processing apparatus according to the embodiment of the present invention, the computation method decision means can identify a pixel value of the image of the first frame corresponding to the target pixel of the interpolation frame and a pixel value of the image of the second frame corresponding to the target pixel of the interpolation frame on the basis of the motion vector allocated to the target pixel, decide the computation method for the pixel value of the target pixel so as to set the identified pixel value of the image of the first frame as the pixel value of the target pixel in a case where the area determination means determines that the target pixel is the pixel in the C area and also the past DFD is smallest among the plurality of evaluation values for evaluating the reliability of the motion vector allocated to the target pixel, decide the computation method for the pixel value of the target pixel so as to set the identified pixel value of the image of the second frame as the pixel value of the target pixel in a case where the area determination means determines that the target pixel is the pixel in the UC area and also the future DFD is smallest among the plurality of evaluation values for evaluating the reliability of the motion vector allocated to the target pixel, and decide the computation method for the pixel value of the target pixel so as to compute the pixel value of the target pixel through the linear interpolation of the identified pixel value of the image of the first frame and the identified pixel value of the image of the second frame in other cases.

According to an embodiment of the present invention, there is provided an image processing method for an image processing apparatus configured to generate, on the basis of an image of a first frame of a moving image and an image of a second frame which comes after the first frame in terms of time, an image of an interpolation frame which comes after the first frame in terms of time and comes before the second frame in terms of time, the image processing method including the steps of: allocating, on the basis of the image of the first frame and the image of the second frame, a motion vector to a pixel of the interpolation frame; allocating, through a compensation of the motion vector, a motion vector to a pixel of the interpolation frame to which the motion vector is not allocated; determining, regarding an area containing a target pixel in the image of the interpolation frame, whether a background displayed in the image of the first frame is a C (Covered) area which is an area covered by a foreground in the second frame, whether the background covered by the foreground in the image of the first frame is a UC (UnCovered) area which is an area displayed in the second frame, or whether the foreground or background displayed in the image of the first frame is a normal area which is an area displayed also in the second frame; and deciding a computation method for a pixel value of the target pixel by computing a plurality of evaluation values for evaluating a reliability of the motion vector allocated to the target pixel and comparing magnitudes of the plurality of evaluation values in a case where it is determined that the target pixel is the pixel in the C area or the pixel in the UC area.

According to an embodiment of the present invention, there is provided a program for allowing a computer to function as an image processing apparatus configured to generate, on the basis of an image of a first frame of a moving image and an image of a second frame which comes after the first frame in terms of time, an image of an interpolation frame which comes after the first frame in terms of time and comes before the second frame in terms of time, the image processing apparatus including: motion vector allocation means adapted to allocate, on the basis of the image of the first frame and the image of the second frame, a motion vector to a pixel of the interpolation frame; motion vector compensation means adapted to compensate a motion vector of a pixel of the interpolation frame to which the motion vector is not allocated by the motion vector allocation means; area determination means adapted to determine, regarding an area containing a target pixel in the image of the interpolation frame, whether a background displayed in the image of the first frame is a C (Covered) area which is an area covered by a foreground in the second frame, whether the background covered by the foreground in the image of the first frame is a UC (UnCovered) area which is an area displayed in the second frame, or whether the foreground or background displayed in the image of the first frame is a normal area which is an area displayed also in the second frame; and computation method decision means adapted to decide a computation method for a pixel value of the target pixel by computing a plurality of evaluation values for evaluating a reliability of the motion vector allocated to the target pixel by the motion vector allocation means or the motion vector compensation means and comparing magnitudes of the plurality of evaluation values in a case where the area determination means determines that the target pixel is the pixel in the C area or the pixel in the UC area.

According to the embodiment of the present invention, on the basis of the image of the first frame and the image of the second frame, the motion vector is allocated to the pixel of the interpolation frame, through the compensation of the motion vector, the motion vector is allocated to the pixel of the interpolation frame to which the motion vector is not allocated, regarding an area containing a target pixel in the image of the interpolation frame, it is determined as to whether a background displayed in the image of the first frame is the C area which is an area covered by a foreground in the second frame, whether the background covered by the foreground in the image of the first frame is the UC area which is an area displayed in the second frame, or whether the foreground or background displayed in the image of the first frame is a normal area which is an area displayed also in the second frame, and the computation method for the pixel value of the target pixel is decided by computing the plurality of evaluation values for evaluating the reliability of the motion vector allocated to the target pixel and comparing the magnitudes of the plurality of evaluation values in a case where it is determined that the target pixel is the pixel in the C area or the pixel in the UC area.

According to the embodiments of the present invention, in any area of the image of the interpolation frame, it is possible to appropriately generate the pixel.

DESCRIPTION OF THE PREFERRED EMBODIMENTS

Before describing an embodiment of the present invention, the correspondence between the features of the claims and the embodiments disclosed in the specification or drawings of the present invention is discussed below. This description is intended to assure that embodiments supporting the claimed invention are described in the specification or drawings. Thus, although described in the specification or drawings, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Figure 14:
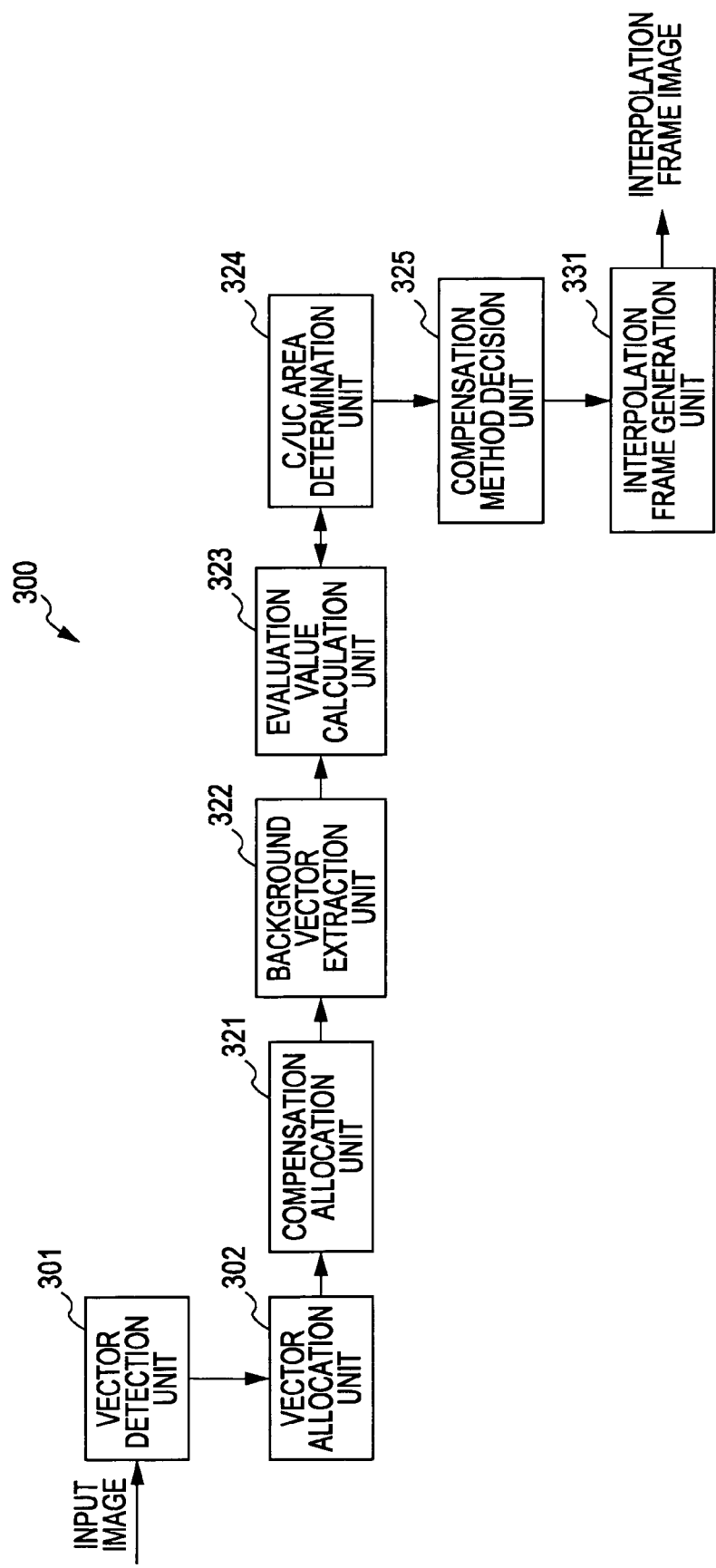
FIG. 14 is a block diagram of a configuration example of an image processing apparatus according to an embodiment to which the present invention is applied.

According to an embodiment of the present invention, there is provided an image processing apparatus configured to generate, on the basis of an image of a first frame of a moving image and an image of a second frame which comes after the first frame in terms of time, an image of an interpolation frame which comes after the first frame in terms of time and comes before the second frame in terms of time, the image processing apparatus including: motion vector allocation means adapted to allocate, on the basis of the image of the first frame and the image of the second frame, a motion vector to a pixel of the interpolation frame (for example, a vector allocation unit 302 of FIG. 14); motion vector compensation means adapted to compensate a motion vector of a pixel of the interpolation frame to which the motion vector is not allocated by the motion vector allocation means (for example, a compensation allocation unit 321 of FIG. 14); area determination means adapted to determine, regarding an area containing a target pixel in the image of the interpolation frame, whether a background displayed in the image of the first frame is a C (Covered) area which is an area covered by a foreground in the second frame, whether the background covered by the foreground in the image of the first frame is a UC (UnCovered) area which is an area displayed in the second frame, or whether the foreground or background displayed in the image of the first frame is a normal area which is an area displayed also in the second frame (for example, a C/UC area determination unit 125 of FIG. 10); and computation method decision means adapted to decide a computation method for a pixel value of the target pixel by computing a plurality of evaluation values (for example, a present DFD, a past DFD, a the future DFD) for evaluating a reliability of the motion vector allocated to the target pixel by the motion vector allocation means or the motion vector compensation means and comparing magnitudes of the plurality of evaluation values in a case where the area determination means determines that the target pixel is the pixel in the C area or the pixel in the UC area (for example, an interpolation method decision unit 325 of FIG. 14).

The image processing apparatus may further includes background vector extraction means adapted to extract a background vector representing a motion of an image of the background of the interpolation frame on the basis of a histogram of the motion vectors allocated to the respective pixels constituting the interpolation frame (for example, a background vector extraction unit 322 of FIG. 14), in which regarding the target pixel, the area determination means can compute a plurality of evaluation values for evaluating a reliability of a background vector (for example, a background vector 111 of FIG. 9), compute the evaluation values for evaluating the reliability of the motion vector (for example, a compensation allocation vector 113 of FIG. 9) allocated to the target pixel by the motion vector allocation means or the motion vector compensation means, and compute magnitudes of the respective evaluation values to determine the area containing the target pixel.

The area determination means can identify a pixel of the first frame corresponding to the target pixel in the interpolation frame and a pixel of the second frame corresponding to the target pixel on the basis of the background vector and also identifies a pixel of a third frame (for example, a frame at a time t−1) which comes before the first frame corresponding to the target pixel in the interpolation frame in terms of time and a pixel of a fourth frame (for example, a frame at a time t+2) which comes after the second frame corresponding to the target pixel in terms of time on the basis of the background vector, compute a DFD between the identified pixel of the first frame and the identified pixel of the second frame to set to be as a present DFD, compute a DFD between the identified pixel of the first frame and the identified pixel of the third frame to set to be as a past DFD, compute a DFD between the identified pixel of the second frame and the identified pixel of the fourth frame to set to be as a future DFD, identify the pixel of the first frame corresponding to the target pixel in the interpolation frame and the pixel of the second frame corresponding to the target pixel on the basis of the compensation vector, compute a DFD between the identified pixel of the first frame and the identified pixel of the second frame to set to be as a DFD of the motion vector allocated to the target pixel, and determine the area containing the target pixel by using the present DFD, the past DFD, and the future DFD of the background vector, and the DFD of the motion vector allocated to the target pixel as the evaluation values.

Figure 15:
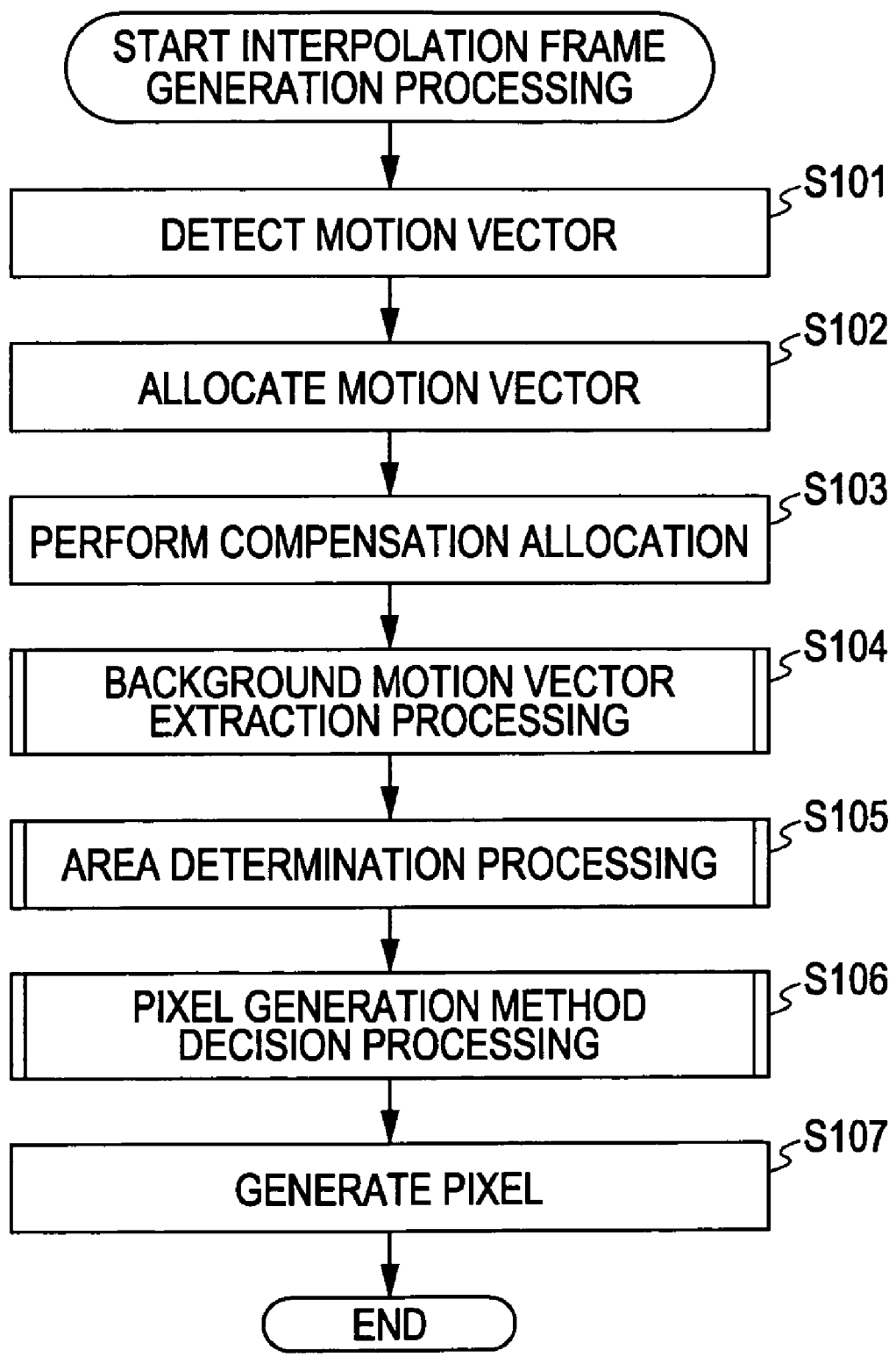
FIG. 15 is a flowchart for describing an interpolation frame generation processing in the image processing apparatus according to the embodiment of the present invention.

According to an embodiment of the present invention, there is provided an image processing method for an image processing apparatus configured to generate, on the basis of an image of a first frame of a moving image and an image of a second frame which comes after the first frame in terms of time, an image of an interpolation frame which comes after the first frame in terms of time and comes before the second frame in terms of time, the image processing method including the steps of: allocating, on the basis of the image of the first frame and the image of the second frame, a motion vector to a pixel of the interpolation frame (for example, a processing in step S101 of FIG. 15); allocating, through a compensation of the motion vector, a motion vector to a pixel of the interpolation frame to which the motion vector is not allocated (for example, a processing in step S103 of FIG. 13); determining, regarding an area containing a target pixel in the image of the interpolation frame, whether a background displayed in the image of the first frame is a C (Covered) area which is an area covered by a foreground in the second frame, whether the background covered by the foreground in the image of the first frame is a UC (UnCovered) area which is an area displayed in the second frame, or whether the foreground or background displayed in the image of the first frame is a normal area which is an area displayed also in the second frame (for example, a processing in step S105 of FIG. 15); and deciding a computation method for a pixel value of the target pixel by computing a plurality of evaluation values (for example, the present DFD, the past DFD, and the future DFD) for evaluating a reliability of the motion vector allocated to the target pixel and comparing magnitudes of the plurality of evaluation values in a case where it is determined that the target pixel is the pixel in the C area or the pixel in the UC area (for example, a processing in step S106 of FIG. 15).

Hereinafter, with reference to the drawings, embodiments of the present invention will be described.

First, a description will be given of an interpolation frame.

Figure 1:
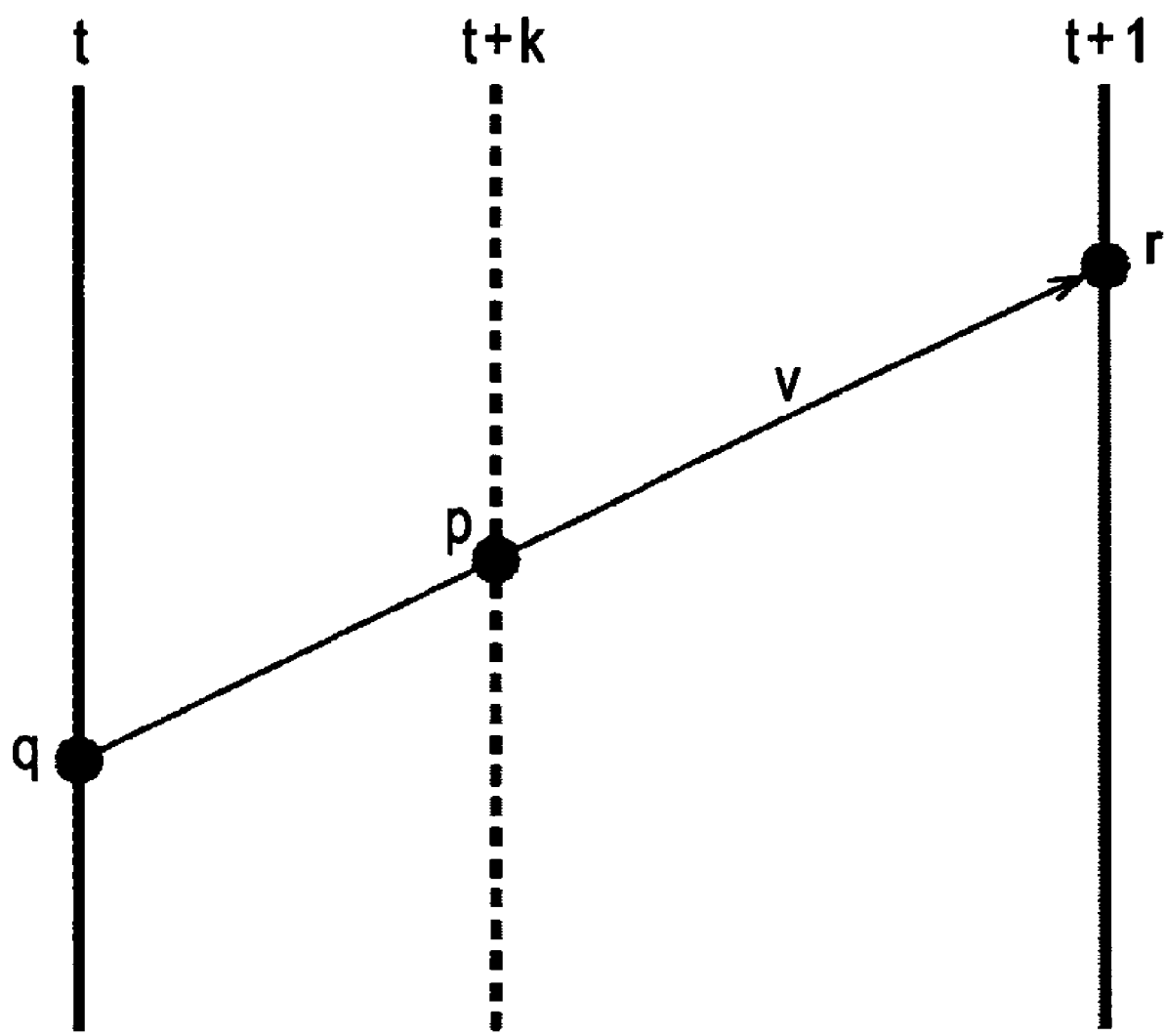
FIG. 1 is an explanatory diagram for describing an interpolation frame.

In data such as a moving image composed of continuous frames in terms of time, for example, as illustrated in FIG. 1, by a motion vector v set in a pixel at a position q of on the basis of a frame at the time t, a pixel at a position q is associated with a pixel at a position r in a frame at a time t+1. It should be noted that the respective pixels of the frame at the time t are previously allocated with a motion vector through a processing by using a gradient method, a block matching method, or the like.

For example, the frame at the time t and the frame at the time t+1 are continuous in terms of time. Originally, after the frame at the time t is reproduced, the frame to be reproduced next is the frame at the time t+1. However, in order to improve a resolution in a time direction of the moving image, a frame at a time t+k positioned between the time t and the time t+1 is generated. The frame at the time t+k generated at this time is referred to as interpolation frame.

A pixel value of the interpolation frame (the frame at the time t+k) in a related art is generated, for example, in the following manner.

The positions of the pixels at the time t and the frame at the time t+1 associated by the motion vector v of the pixel at the position p of the frame at the time t+k are the position p and the position r. A pixel value $F_{t+k}(p)$ at the position p of the frame at the time t+k is calculated through the linear interpolation by the inverse ratio (1−k):k of the time positions from the two points q and r as represented by Expression (1). It should be noted that a pixel value at the position q of the frame at the time t is represented by Ft(q), and a pixel value at the position r of the frame at the time t+1 is represented by Ft+1(r).

$$Ft+k(p)=(1-k)Ft(q)+kFt+1(r) \quad (1)$$

Next, compensation of the motion vector will be described.

For example, the motion vector can be allocated to the respective pixels in the moving image in advance through a processing by using the gradient method, the block matching method, or the like.

Figure 2:
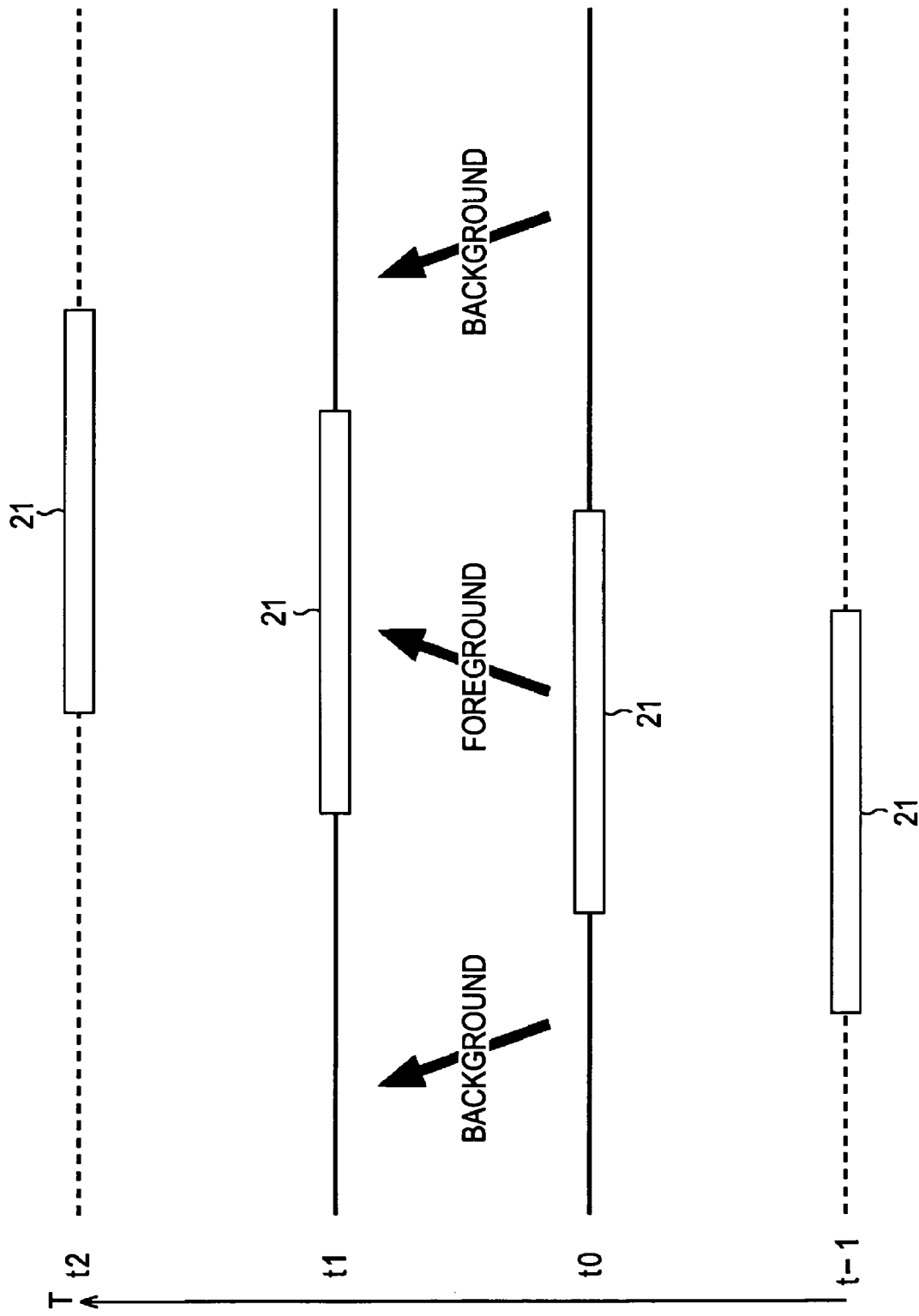
FIG. 2 illustrates a moving image example.

For example, as illustrated in FIG. 2, such a case will be considered that an object functioning as a foreground is moved in the right direction in the drawing along with the elapse of time. FIG. 2 illustrates a moving image example where an object 21 is displayed, representing images of frames at four different times including a time t−1 to a time t2. Herein, to simplify the description, the image of the frame is represented in a one-dimensional (linear) manner. That is, the vertical axis of FIG. 2 represents the time, and the horizontal axis of FIG. 2 represents the position of the image (pixel).

In FIG. 2, the object 21 of the frame at the time t−1 functioning as the image which comes earliest in terms of time is moved slightly in the right direction in the frame at the time t0, and further moved in the right direction in the frame at the time t1. The object 21 of the frame at the time t2 functioning as the image which comes latest in terms of time is further moved in the right direction. Also, although not represented in the same drawing, the image of the background of the object 21 is moved in the left direction of the screen along with the elapse of time.

Figure 3:
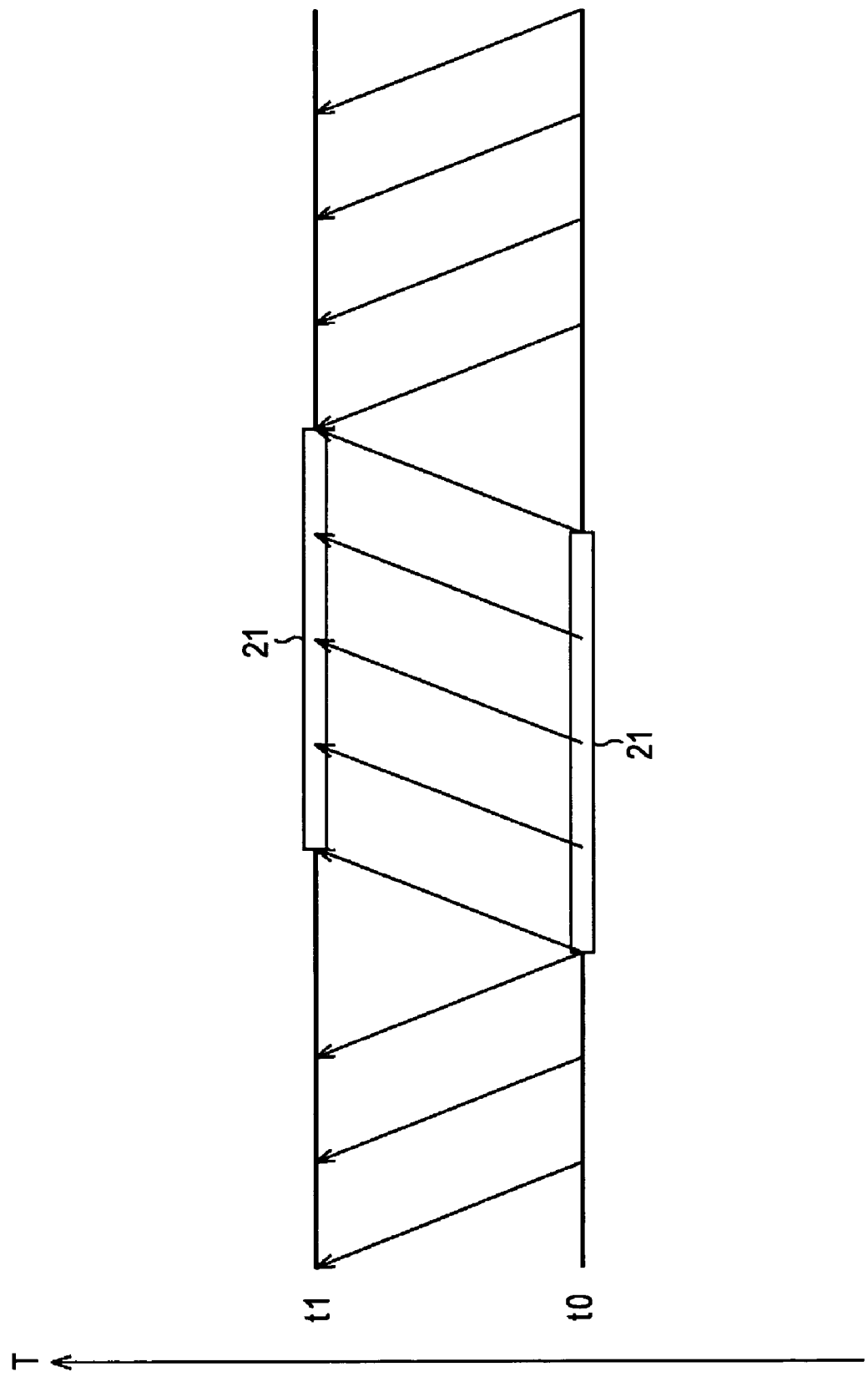
FIG. 3 is an explanatory diagram for describing detection of a motion vector in a related art.

On the basis of the images of the frame at the time t0 and the frame at the time t1, when the motion vector detection is performed through a method in the related art by using the gradient method, the block matching method, or the like, motion vectors represented by arrows in FIG. 3 are detected. That is, motion vectors heading toward the right side in the drawing are detected in the pixel of the object 21, and motion vectors heading toward the left side in the drawing are detected in the pixel of the background.

Figure 4:
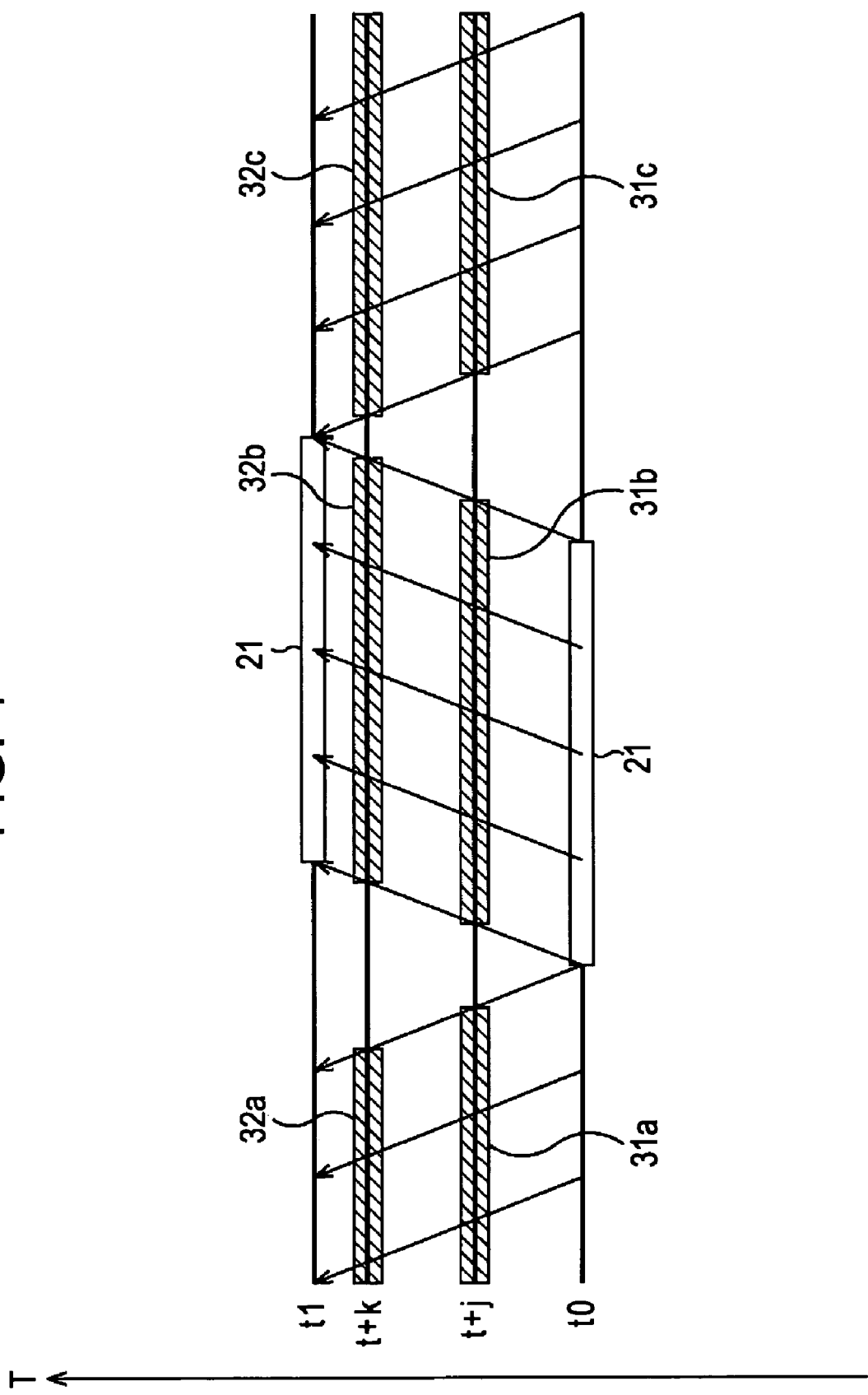
FIG. 4 is an explanatory diagram for describing an area through which a motion vector passes.

In a case where frames at a time t+j and the time t+k between the time t0 and the time t1 are generated as the interpolation frames on the basis of the motion vectors illustrated in FIG. 3, motion vectors allocated to the pixel of the interpolation frame are as illustrated in FIG. 4.

FIGS. 4 to 7 illustrate moving image examples where the object 21 is displayed, representing images of frames at four different times including the time t0, the time t+j, the time t+k, and the time t1. Herein, the frame at the time t+j and the frame at the time t+k are the interpolation frames. Also, herein too, to simplify the description, the image of the frame is represented in a one-dimensional (linear) manner. The vertical axis represents the time, and the horizontal axis represents the position of the image (pixel).

Pixels in an area 31a and an area 31c of the interpolation frames at the time t+j are pixels constituting the image of the background, and thus allocated with the motion vectors heading toward the left direction as represented by the arrows in the drawing. On the other hand, a pixel in an area 31b of the interpolation frame at the time t+j is a pixel constituting the image of the object 21, and thus allocated with the motion vectors heading toward the right direction as represented by the arrows in the drawing.

Also, similarly, pixels in an area 32a and an area 32c of the interpolation frames at the time t+k are pixels constituting the image of the background, and thus allocated with the motion vectors heading toward the left direction as represented by the arrows in the drawing. A pixel in an area 32b of the interpolation frame at the time t+k is a pixel constituting the image of the object 21, and thus allocated with the motion vectors heading toward the right direction as represented by the arrows in the drawing.

Figure 5:
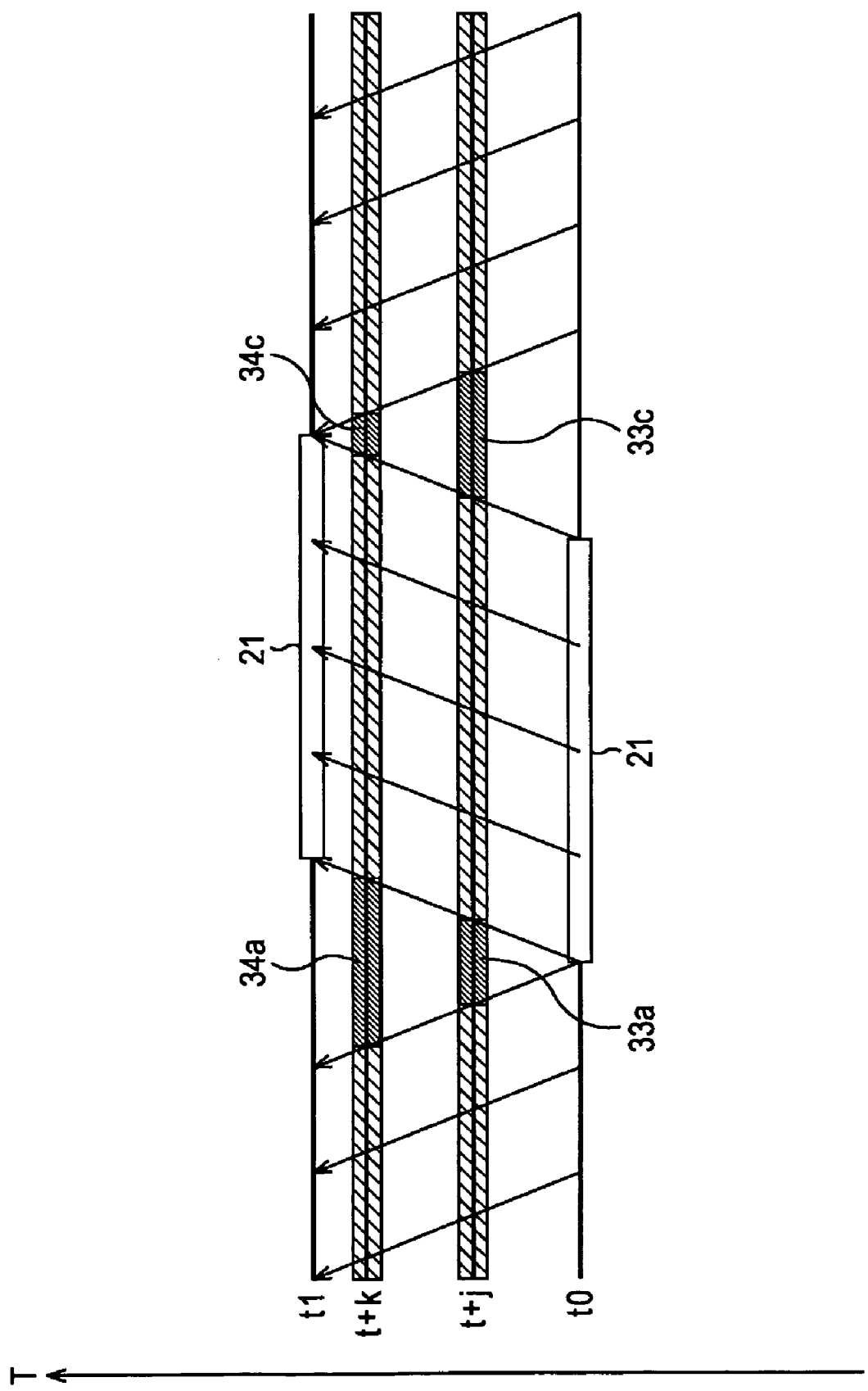
FIG. 5 is an explanatory diagram for describing an area through which a motion vector does not pass.

However, as illustrated in FIG. 5, pixels in an area 33a and an area 33c of the interpolation frames at the time t+j are not allocated with motion vectors. The pixel of the area 33a is originally a pixel of the image of the background, but has no corresponding pixel in the image of the frame at the time t0. Thus, no motion vectors are allocated. Also, the pixel of the area 33c is originally a pixel of the image of the background, but has no corresponding pixel in the image of the frame at the time t1. Thus, no motion vectors are allocated.

Similarly, motion vectors are not allocated to pixels in an area 34a and an area 34c of the interpolation frames at the time t+k.

Figure 6:
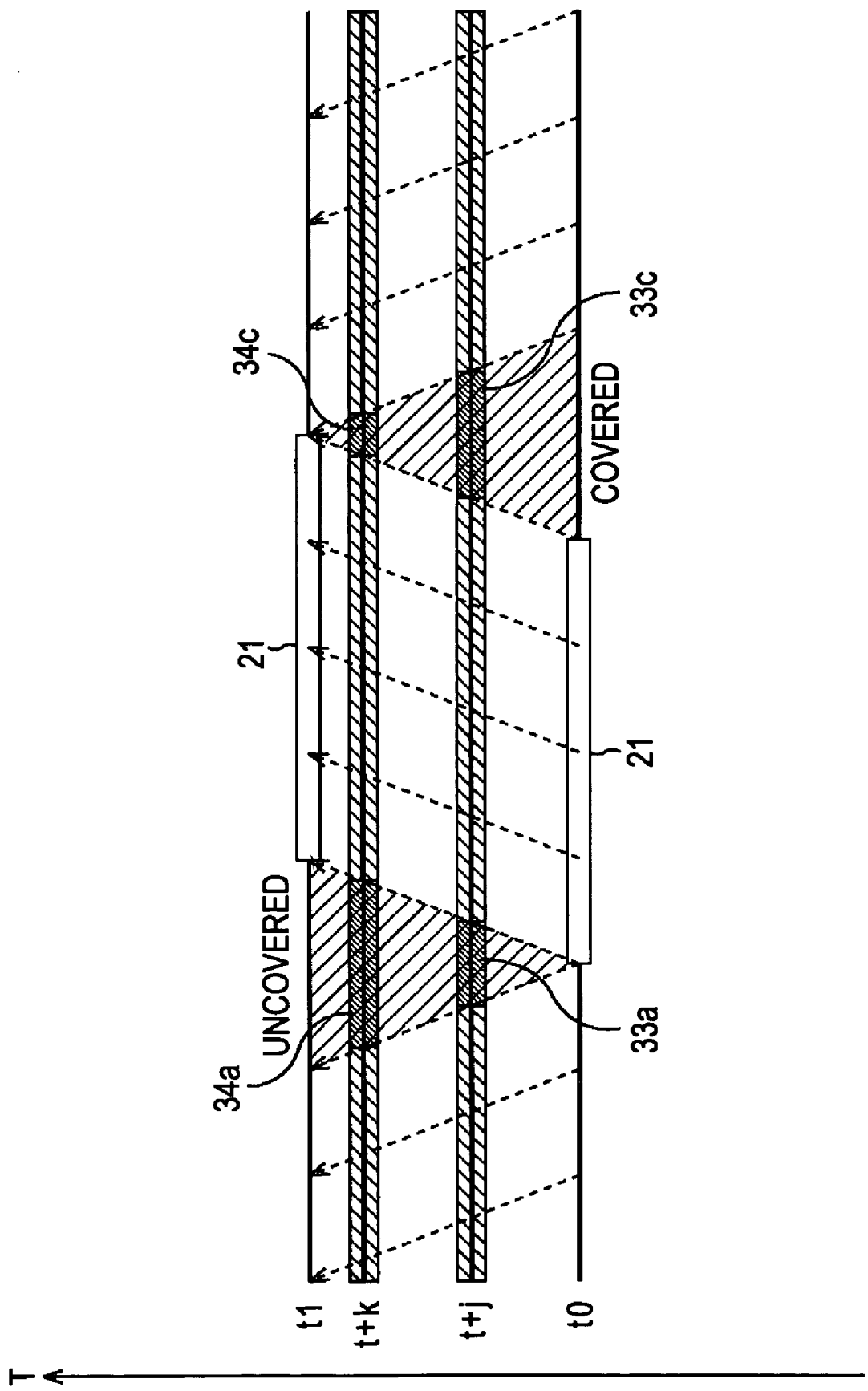
FIG. 6 is an explanatory diagram for describing a C area and an UC area.

In this manner, in the case of a moving image where motions of the foreground and the background are different from each other, for example, such an area is generated to which motion vectors used for the generation of the interpolation frame or the like are not allocated. As illustrated in FIG. 6, a triangular area in the drawing containing the area 33c and the area 34c is an area gradually disappearing where the image of the background is covered by the image of the foreground (the object 21) along with the elapse of time. This area is therefore referred to as C (Covered) area. Also, an inverted triangular area in the drawing containing the area 33a and the area 34a is an area gradually appearing where the image of the background covered by image of the foreground (the object 21) is uncovered along with the elapse of time. This area is therefore referred to as UC (UnCovered).

For example, in the generation of the interpolation frame, the C area and the UC area can be rephrased into areas through which the motion vectors do not pass.

In the generation of the interpolation frame, for generating the areas through which the motion vectors do not pass, some motion vectors are allocated to the areas to compensate the motion vectors. In a case where the motion vectors are compensated in such areas, for example, most appropriate motion vectors are selected among vectors in the periphery of the target pixel or 0 vectors and allocated as motion vectors of the target pixel. The motion vector compensated and allocated in this manner is referred to as compensation allocation vector.

It should be noted that the compensation allocation vector is selected, for example, among the motion vectors allocated to the respective pixels in the periphery of the target pixel as the optimal motion vector of the target pixel to be allocated.

For example, in a case where the pixel at the position P the frame at the time t is associated with a pixel at a position P' of the frame at the time t+1 with the motion vector v, a sum of absolute differences is computed respectively between m×n pixels with the center of the pixel at the position P and m×n pixels with the center of the pixel at the position P' (DFD: Displaced Frame Difference). The DFD is used, for example, as an evaluation value for evaluating a reliability of the motion vector. As the DFD is smaller, it can be mentioned that the motion vector more appropriately reflects the motion of the target pixel. The DFD is computed for each of the motion vectors allocated to the pixels in the periphery of the target pixel in this manner, and the motion vector having the smallest value of the DFD is selected as the compensation allocation vector.

Figure 7:
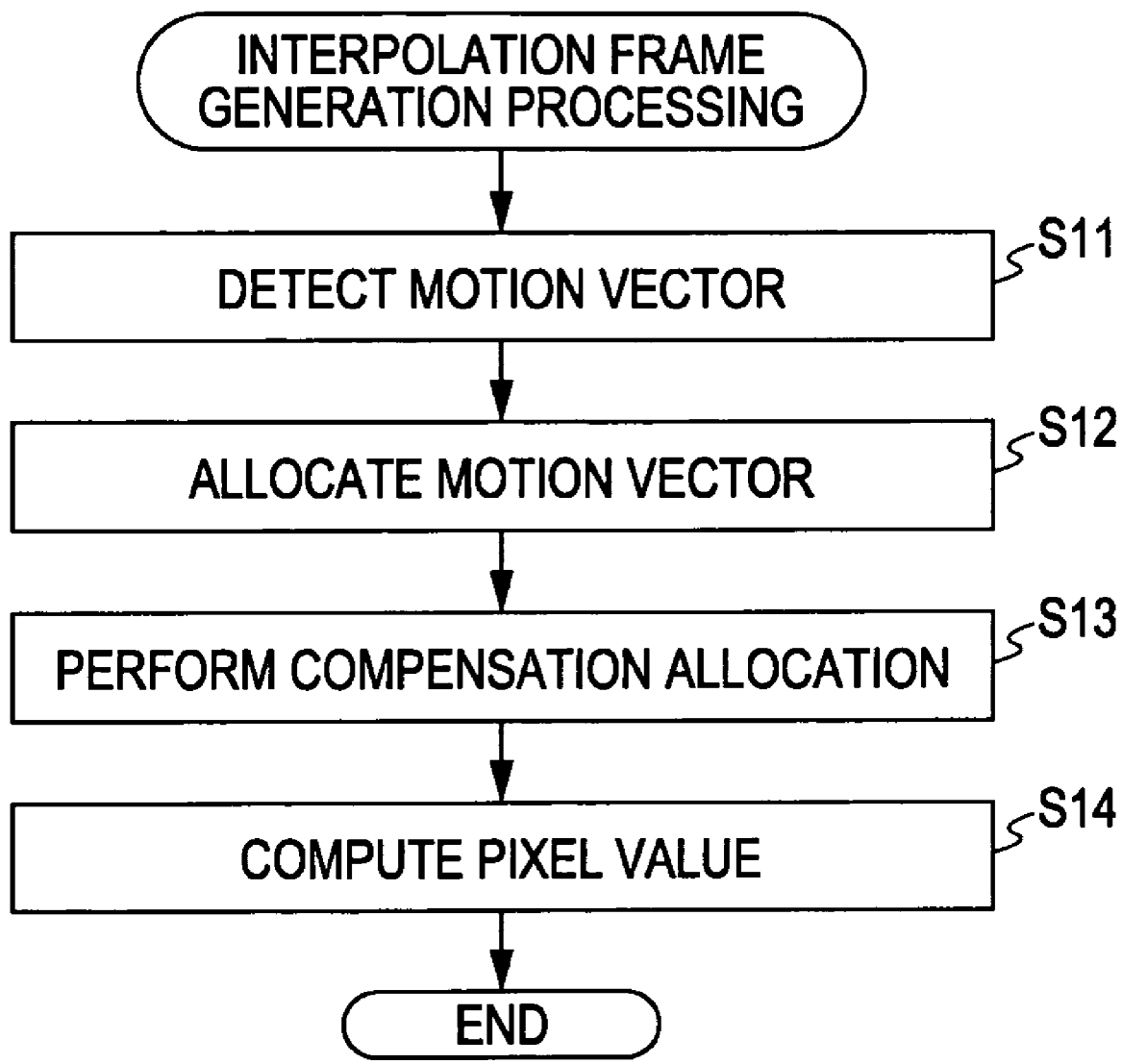
FIG. 7 is a flowchart for describing an interpolation frame generation processing in a related art.

FIG. 7 is a flowchart for describing an interpolation frame generation processing in the related art.

That is, in step S11, on the basis of the frame at the time t and the frame at the time t+1 of the input image, motion vectors are detected. At this time, for example, the motion vectors are detected through the gradient method, the block matching method, or the like.

In step S12, the motion vectors detected in step S11 are allocated to the respective pixels of the interpolation frame which is the frame at the time t+k.

In step S13, the pixels to which the motion vectors are not allocated such as the pixels in the C area and the UC area of the interpolation frame are subjected to compensation allocation, for example, by allocating surrounding motion vectors or the like.

In step S14, the pixel values of the respective pixels of the interpolation frame are computed by using the motion vectors compensated and allocated through the processing in step S12 or the processing in step S13 (the compensation allocation vectors). At this time, for example, the pixel values are computed through the linear interpolation described with reference to Expression (1).

However, in the C area and the UC area, as described above with reference to Expression (1), it is not appropriate that the pixel values of the interpolation frame are computed through the linear interpolation by using the pixels of the two frames.

As described above, this is because the C area is an area gradually disappearing where the image of the background is covered by the image of the foreground (the object 21) along with the elapse of time. Thus, the pixel corresponding to the pixel in the C area does not exist in the frame which comes after in terms of time. Also, this is because the UC area is an area gradually appearing where the image of the background covered by image of the foreground (the object 21) is uncovered along with the elapse of time. Thus, the pixel corresponding to the pixel in the UC area does not exist in the frame which comes before in terms of time.

For this reason, in a case where a predetermined pixel of the interpolation frame is generated, it is determined whether the pixel is a pixel in the C area, a pixel in the UC area, or a pixel in an area other than the C area or the UC area (which will be referred to as normal area), and the pixel should be generated through a method corresponding to these areas.

In view of the above, according to the embodiment of the present invention, it is determined whether the target pixel of the interpolation frame is the pixel in the C area, the pixel in the UC area, or the pixel in the normal area, and the pixel is generated through a method corresponding to these areas.

It can be determined whether the target pixel is the pixel in the C area, the pixel in the UC area, or the pixel in the normal area, for example, in the following manner.

Figure 8:
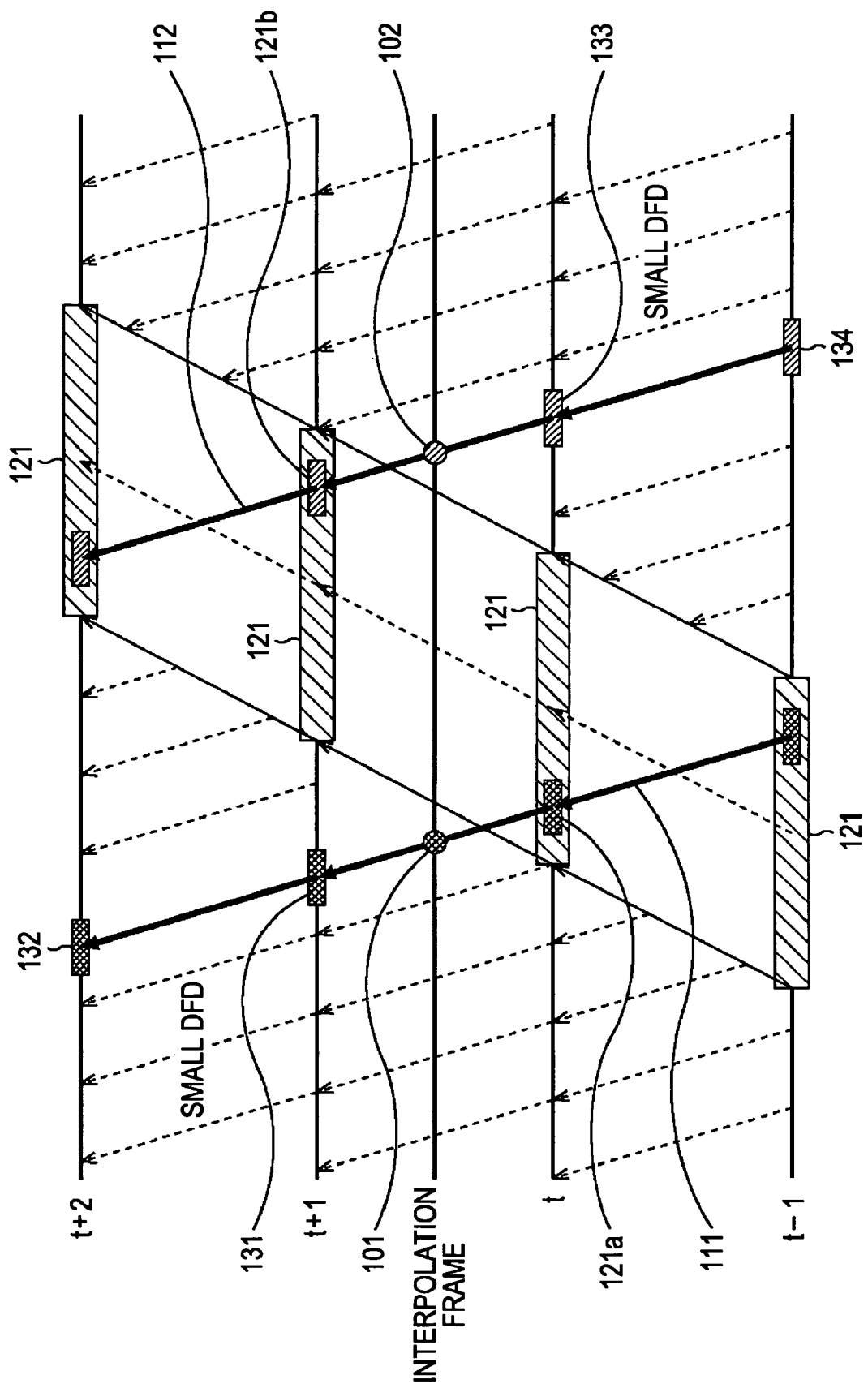
FIG. 8 is an explanatory diagram for describing computation of a DFD in the C area or the UC area.

FIG. 8 illustrates a moving image example where an object 121 is displayed, representing images of frames at four different times including the time t−1 to a time t+2. The vertical axis represents the time, and the horizontal axis represents the position of the image (pixel). The object 121 is moved in the right direction in the drawing along with the elapse of time, and also, the image of the background of the object 121 is moved in the left direction of the screen along with the elapse of time. In the same drawing, the arrows depicted by the dotted lines in the drawing represent the motion vectors detected by the method in the related art.

Now, a case where the area of the target pixel is determined while a pixel 101 in the UC area of the interpolation frame and a pixel 102 in the C area are set as the respective target pixels is described.

In order to determine the area of the target pixel, the background vector which is a motion vector representing the motion of the image of the background is temporarily allocated to the target pixel. It should be noted that the extraction of the background vectors will be described below. Then, on the basis of the background vector, the DFD is computed in the above-mentioned manner.

In the example of FIG. 8, as the temporarily allocated background vectors, the pixel 101 and the pixel 102 show the background vector 111 and a background vector 112 represented by bold arrows in the drawing. In the example of the same drawing, the background vector 111 and the background vector 112 are the motion vectors depicted by the dotted lines in the drawing and detected by the method in the related art, having substantially the same direction as the motion vector representing the motion of the background. Thus, the background vector 111 and the background vector 112 are extended in terms of time so as to reach the time t−1 to the time t+2. That is, on the basis of the background vector 111 or the background vector 112, the pixel of the frame at the time t+2 or the pixel of the frame at the time t−1 corresponding to the pixel of the frame at the time t or the pixel of the frame at the time t+1 is identified.

In the C area or the UC area, on the basis of the background vector, even when the image of the frame at the time t and the image of the frame at the time t+1 are used to compute the DFD, the computation for a sum of absolute differences between the pixel of the image of the foreground (object) and the pixel of the image of the background is performed. In the example of FIG. 8, when the image of the frame at the time t0 and the image of the frame at the time t1 are used, on the basis of the background vector 111, a sum of absolute differences between an area 121a of the image of the foreground and an area 131 of the image of the background is computed, and on the basis of the background vector 112, a sum of absolute differences between an area 121b of the image of the foreground and an area 133 of the image of the background is computed.

In view of the above, according to the embodiment of the present invention, an image of the frame at the time t+2 which comes after the time t+1 in terms of time and an image of the frame at the time t−1 which comes before the time t in terms of time are further used for the computation for the DFD.

In the example of FIG. 8, when the image of the frame at the time t+1 and the image of the frame at the time t+2 are used, on the basis of the background vector 111, a sum of absolute differences between the area 131 of the image of the background and an area 132 of the image of the background is computed. Also, when the image of the frame at the time t and the image of the frame at the time t−1 are used, on the basis of the background vector 112, a sum of absolute differences between the area 133 of the image of the background and an area 134 of the image of the background is computed.

Herein, the DFD using the image of the frame at the time t and the image of the frame at the time t+1 is referred to as "present DFD", and the DFD using the image of the frame at the time t+1 and the image of the frame at the time t+2 is referred to as "future DFD". In addition, the DFD using the image of the frame at the time t and the image of the frame at the time t−1 is referred to as "past DFD".

That is, regarding the pixel in the UC area, when the future DFD is computed on the basis of the background vector, the DFD value should be small. As described above, this is because the sum of absolute differences between the areas of the images of the background is computed. Also, regarding the pixel in the C area, when the past DFD is computed on the basis of the background vector, the DFD value should be small. As described above, this is because the sum of absolute differences between the areas of the images of the background is computed.

Also, in the C area or the UC area, a possibility that the compensation allocation vectors allocated to the respective pixels appropriately reflect the motion of the pixel is small. For this reason, even when the DFD is computed on the basis of the compensation allocation vector, the DFD value should not be small.

Figure 9:
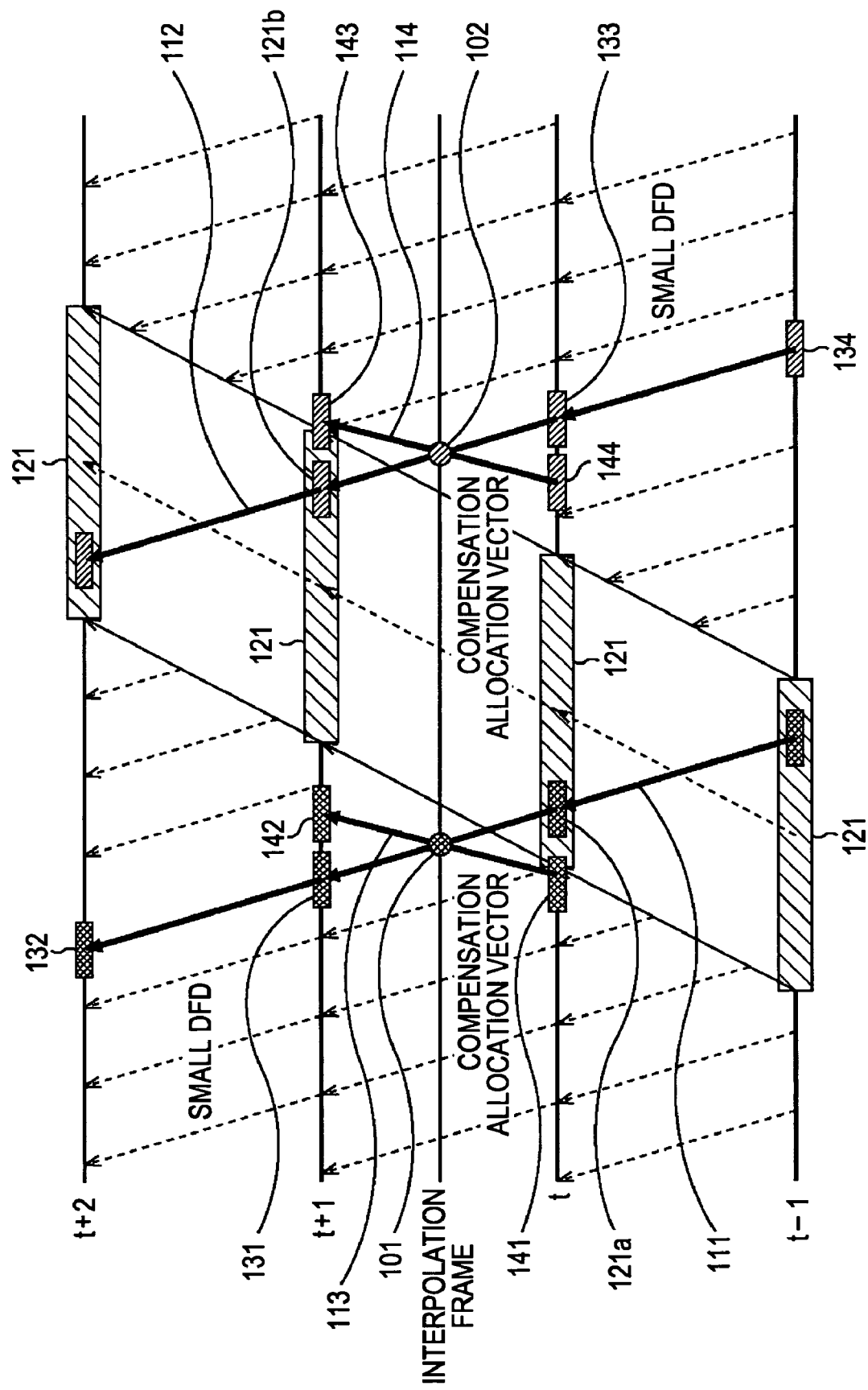
FIG. 9 is an explanatory diagram for describing a determination on the area based on the DFD.

FIG. 9 illustrates, similarly to FIG. 8, a moving image example where the object 121 is displayed. In the example of the same drawing, the pixel 101 in the C area is allocated with the compensation allocation vector 113, and the pixel 102 in the UC area is allocated with the compensation allocation vector 114.

In the example of FIG. 9, by using the image of the frame at the time t and the image of the frame at the time t+1, on the basis of the compensation allocation vector 113, a sum of absolute differences between an area 141 of the images of the foreground and the background and an area 142 of the image of the background is computed, and on the basis of the compensation allocation vector 114, a sum of absolute differences between an area 143 of the images of the foreground and the background and an area 144 of the image of the background is computed.

In this manner, in the C area or the UC area, even when the DFD is computed on the basis of the compensation allocation vector, a possibility is small that the DFD value becomes small.

According to the embodiment of the present invention, as described above, the four DFDs including the present DFD, the past DFD, and the future DFD based on the background vector and the DFD based on the compensation allocation vector are computed, and the area of the target pixel is determined by comparing the magnitudes thereof.

That is, among the above-mentioned four DFDs, in a case where the past DFD is the smallest, it is determined that the target pixel is the pixel in the C area.

Also, among the above-mentioned four evaluation values, in a case where the future DFD is the smallest, it is determined that the target pixel is the pixel in the UC area.

Furthermore, among the above-mentioned four evaluation values, in a case where the present DFD is the smallest or the DFD of the compensation allocation vector is the smallest, it is determined that the area of the target pixel is the normal area.

It should be noted that in a predetermine case, through the above-mentioned method, it is difficult to determine whether the target pixel is the pixel in the C area, the pixel in the UC area, or the pixel in the normal area. For example, a case illustrated in FIG. 10 will be considered.

Figure 10:
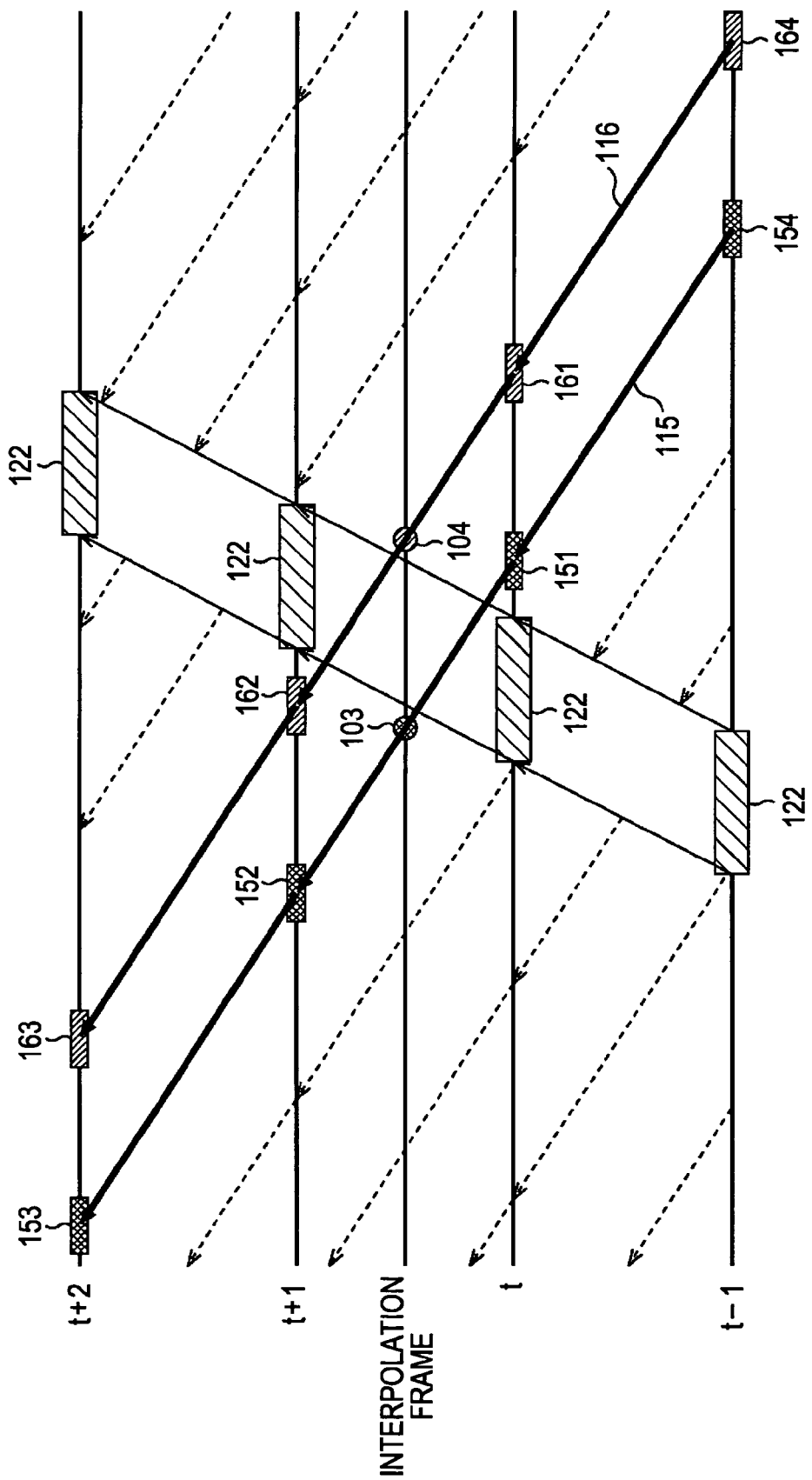
FIG. 10 is an explanatory diagram for describing a determination on the area based on the DFD.

FIG. 10 illustrates a moving image example where an object 122 is displayed, representing images of frames at four different times including the time t−1 to the time t+2. The vertical axis represents the time, and the horizontal axis represents the position of the image (pixel). The object 122 is moved in the right direction in the drawing along with the elapse of time, and also, the image of the background of the object 122 is moved in the left direction of the screen along with the elapse of time. In the same drawing, the arrows depicted by the dotted lines in the drawing represent the motion vectors detected by the method in the related art. In the case of FIG. 10, the motion of the background is larger as compared with the case of FIG. 8, and also, the area of the object functioning as the foreground is smaller.

In the example illustrated in FIG. 10, even when a background vector 115 is allocated to the pixel 103 in the UC area, the future DFD may not be smallest in some cases. This is because as the motion of the background is large, the background vector 115 penetrates the foreground (the object 122).

Therefore, the future DFD regarding the pixel 103 becomes a sum of absolute differences between an area 152 of the image of the background and an area 153 of the image of the background, and a possibility is large that the DFD becomes small. Also, the past DFD becomes a sum of absolute differences between an area 151 of the image of the background and an area 154 of the image of the background, and a possibility is large that the DFD becomes small. Similarly, the present DFD becomes also becomes a sum of absolute differences between the area 151 of the image of the background and the area 152 of the image of the background, and a possibility is large that the DFD becomes small.

In addition, in the example illustrated in FIG. 10, even when a background vector 116 is allocated to the pixel 104 in the C area, the past DFD may not be smallest in some cases. This is because as the motion of the background is large, the background vector 116 penetrates the foreground (the object 122). Therefore, the past DFD regarding the pixel 104 becomes a sum of absolute differences between an area 161 of the image of the background and an area 164 of the image of the background, and there is a large possibility that the DFD becomes small. Also, the future DFD becomes a sum of absolute differences between an area 162 of the image of the background and an area 163 of the image of the background, and there is a large possibility that the DFD becomes small. Similarly, the present DFD also becomes a sum of absolute differences between the area 161 of the image of the background and the area 162 of the image of the background, and there is a large possibility that the DFD becomes small.

In this manner, in a case where all the present DFD, the past DFD, and the future DFD have small values, the reliability of the determination result for the area of the target pixel is considered to be low. In view of the above, by respectively comparing the present DFD, the past DFD, and the future DFD with previously set threshold, in a case where the present DFD, the past DFD, and the future DFD are respectively smaller than the threshold, it is determined that the target pixel is the pixel in the normal area.

In the above-mentioned manner, it is determined whether the target pixel of the interpolation frame is the pixel in the C area, the pixel in the UC area, or the pixel in the normal area.

As described above, in the C area and the UC area, as described above with reference to Expression (1), it is not appropriate that the pixel values of the interpolation frame are computed through the linear interpolation by using the pixels of the two frames. Therefore, according to the embodiment of the present invention, the pixel of the interpolation frame is generated in the C area and the UC area, through a method different from the method described with reference to Expression (1). Next, the generation method for the pixel of the interpolation frame in the C area and the UC area will be described.

Figure 11:
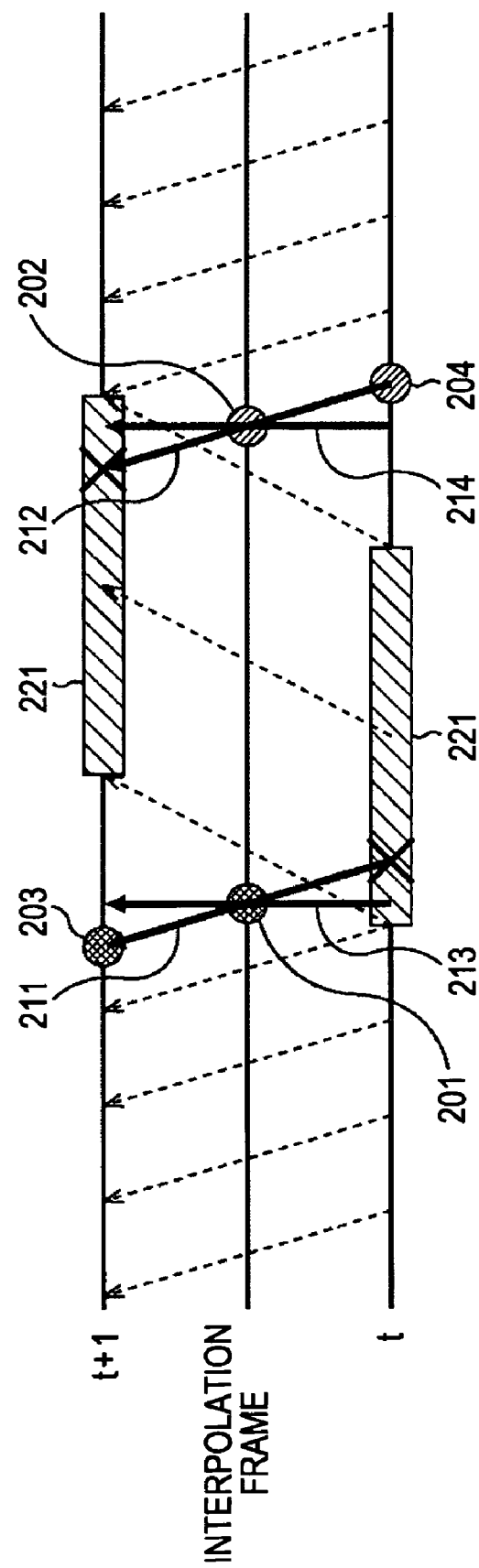
FIG. 11 is an explanatory diagram for describing computation of a pixel value of the C area and the UC area of the interpolation frame.

FIG. 11 illustrates a moving image example where an object 221 is displayed, representing an image of the frame at the time t and an image of the frame at the time t+1. The vertical axis represents the time, and the horizontal axis represents the position of the image (pixel). The object 221 is moved in the right direction in the drawing along with the elapse of time, and also, the image of the background of the object 221 is moved in the left direction of the screen along with the elapse of time. In the same drawing, the arrows depicted by the dotted lines in the drawing represent the motion vectors detected by the method in the related art.

As described above, regarding a pixel 201 in the UC area, a corresponding pixel in the past frame (the frame which comes before in terms of time) does not exist. Thus, if the linear interpolation using the pixel of the past frame is performed at the time of generating the pixel in the UC area, a pixel different from the pixel that should be originally generated is generated. That is, the pixel that should be used for the computation for the pixel value of the pixel 201 is only a pixel 203 of the frame at the time t+1. The pixel 203 is associated with the pixel 201 through the motion vector 211 representing the motion of the background.

Also, regarding a pixel 202 in the C area, a corresponding pixel does not exist in the future frame (in the frame which comes after in terms of time). Thus, if the linear interpolation using the pixel of the future frame is performed at the time of generating the pixel in the C area, a pixel different from the pixel that should be originally generated is generated. That is, the pixel that should be used for the computation for the pixel value of the pixel 201 is only a pixel 204 of the frame at the time t. The pixel 204 is associated with the pixel 202 through the motion vector 212 representing the motion of the background.

In this manner, in the C area and the UC area, as described above with reference to Expression (1), instead of computing the pixel value of the interpolation frame through the linear interpolation by using the pixels of the two frames at the time t and the time t+1 (which will be appropriately referred to as double-sided interpolation), when an interpolation using the pixel of one of the frame at the time t and the frame at the time t+1 (which will be appropriately referred to as one-sided interpolation) is performed, it is possible to appropriately compute the pixel value. In the case of the one-sided interpolation, for example, the pixel value of the pixel 201 is the same value as the pixel value of the pixel 203, and, for example, the pixel value of the pixel 202 is the same value as the pixel value of the pixel 204.

However, there is no guarantee that the motion vector 211 or the motion vector 212 accurately representing the motion of the background can be extracted. In the C area and the UC area, no motion vectors are allocated from the beginning, and therefore some motion vectors should be selected and compensated. At this time, if the motion vector 211 or the motion vector 212 accurately representing the motion of the background can be extracted, it is possible to obtain the appropriate pixel value through the above-mentioned the one-sided interpolation. However, for example, in a case were a motion vector 213 or motion vector 214 are extracted as the motion vector representing the motion of the background, a possibility that the appropriate pixel value can be obtained through the above-mentioned one-sided interpolation is decreased.

Also, in a case were the area of the target pixel is erroneously determined, a possibility that the appropriate pixel value can be obtained through the above-mentioned one-sided interpolation is decreased too. For example, in a case were it is erroneously determined that the pixel in the normal area or the pixel in the UC area is the pixel in the C area, even if the motion vector representing the motion of the background can be accurately extracted, if the pixel value of the target pixel is computed through the one-sided interpolation, it is difficult to obtain the appropriate pixel value.

Figure 12:
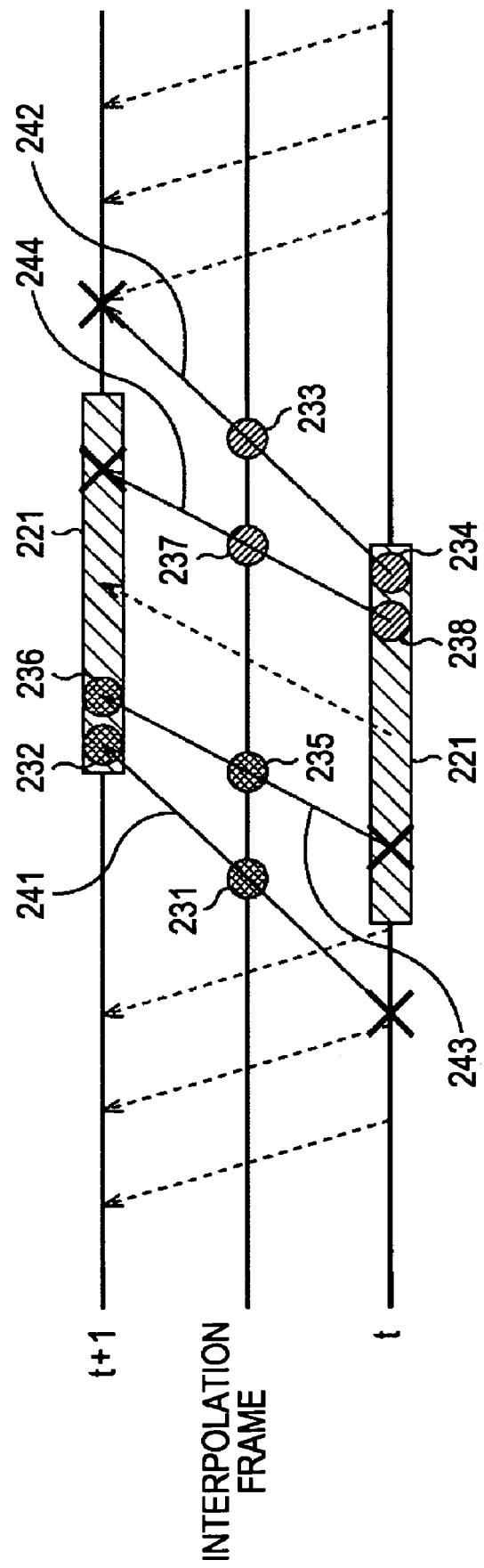
FIG. 12 is an explanatory diagram for describing computation of a pixel value of the C area and the UC area of the interpolation frame.

On the other hand, the one-sided interpolation using the compensation allocation vector allocated to the pixels in the C area and the UC area will be considered. FIG. 12 illustrates, similarly to FIG. 11, a moving image example where the object 221 is displayed. In the example of the same drawing, a pixel 231 is set as the pixel in the UC area, and a pixel 233 is set as the pixel in the C area.

Now, it is assumed that the pixel 231 is allocated with a compensation allocation vector 241. The compensation allocation vector 241 is, for example, selected among the motion vectors respectively allocated to the pixels in the periphery of the pixel 231. In the current situation, the compensation allocation vector 241 does not appropriately reflect the motion of the pixel 231.

Regarding the pixel 231, the pixel of the frame at the time t+1 associated by the compensation allocation vector 241 is a pixel 232 which constitutes a part of the image of the object 221. After the one-sided interpolation performed in the above-mentioned manner, the pixel value of the pixel 231 is set as the same value as the pixel value of the pixel 232, and the image of the interpolation frame is degraded.

Similarly, it is assumed that the pixel 233 is allocated with the compensation allocation vector 242. The compensation allocation vector 242 is, for example, selected among the motion vectors respectively allocated to the pixels in the periphery of the pixel 232. In the current situation, the compensation allocation vector 242 does not appropriately reflect the motion of the pixel 232.

Regarding the pixel 232, the pixel of the frame at the time t associated by the compensation allocation vector 242 is a pixel 234 which constitutes a part of the image of the object 221. After the one-sided interpolation performed in the above-mentioned manner, the pixel value of the pixel 232 is set as the same value as the pixel value of the pixel 234, and the image of the interpolation frame is degraded.

However, in a case were the area of the target pixel is erroneously determined, a possibility that the appropriate pixel value can be obtained through the one-sided interpolation using the compensation allocation vector.

In FIG. 12, it is assumed that a pixel 235 is originally a pixel in the normal area (a part of the object 221), but erroneously determined as a pixel in the UC area, and a pixel 237 is originally a pixel in the normal area, but erroneously determined as a pixel in the C area. It should be noted that in many cases, the pixel in the normal area is allocated with the motion vector in advance without performing the compensation allocation, but herein, the description will be given by assuming that the pixel 235 and the pixel 237 are not allocated with the motion vectors detected through the gradient method, the block matching method, or the like, and the motion vectors are compensated and allocated.

Now, the pixel 235 is assumed to be allocated with the compensation allocation vector 243. The compensation allocation vector 243 is, for example, selected among the motion vectors respectively allocated to the pixels in the periphery of the pixel 235. In the current situation, the compensation allocation vector 243 appropriately reflects the motion of the pixel 231.

Regarding the pixel 235, the pixel of the frame at the time t+1 associated by the compensation allocation vector 243 is a pixel 236 which constitutes a part of the image of the object 221. After the one-sided interpolation performed in the above-mentioned manner, the pixel value of the pixel 235 is set as the same value as the pixel value of the pixel 236. In this case, the image of the interpolation frame is not degraded.

Similarly, it is assumed that the pixel 237 is allocated with the compensation allocation vector 244. The compensation allocation vector 244 is, for example, selected among the motion vectors respectively allocated to the pixels in the periphery of the pixel 237. In the current situation, the compensation allocation vector 244 appropriately reflects the motion of the pixel 237.

Regarding the pixel 237, the pixel of the frame at the time t associated by the compensation allocation vector 242 is a pixel 238 which constitutes a part of the image of the object 221. After the one-sided interpolation performed in the above-mentioned manner, the pixel value of the pixel 237 is set as the same value as the pixel value of the pixel 238. In this case, the image of the interpolation frame is not degraded.

As described above with reference to FIGS. 11 and 12, in the computation for the pixel values in the C area and the UC area, it may be ideal that the motion vector accurately representing the motion of the background is extracted, and by using the motion vector, the pixel value is computed through the one-sided interpolation. In this case, the motion vector accurately representing the motion of the background should be allocated and compensated to the pixels in the C area and the UC area in addition to the compensation allocation vector compensated in the related art method.

However, there is no guarantee that the motion vector accurately representing the motion of the background can be extracted. Also, when a consideration is given of such a technical background that the area of the target pixel may be erroneously determined, in the generation of the interpolation frame, it is not a fine approach to adopt a method of allocating and compensating the motion vector representing the motion of the background to the pixels in the C area and the UC area.

Figure 13:
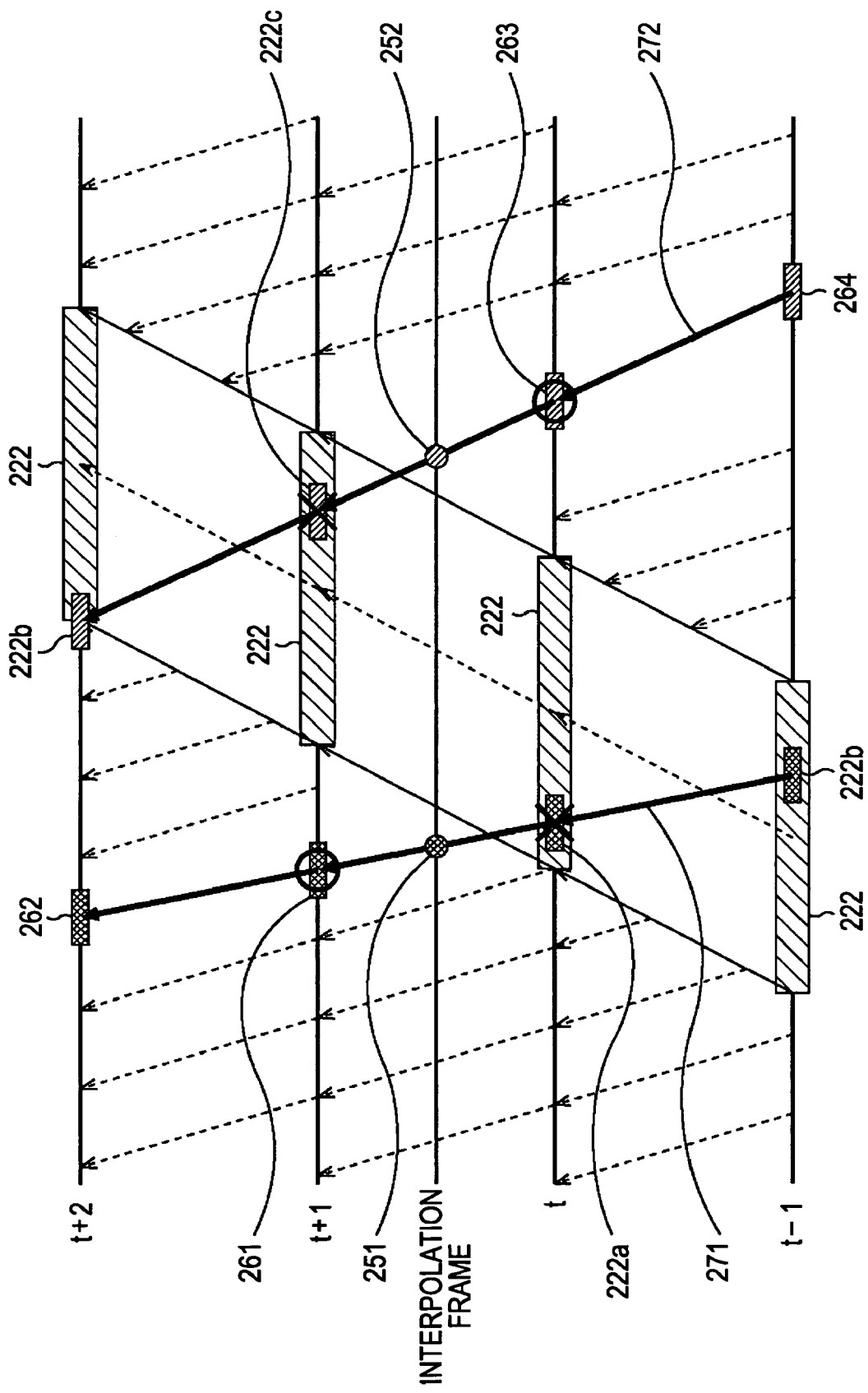
FIG. 13 is an explanatory diagram for describing computation of a pixel value of the C area and the UC area of the interpolation frame.

In view of the above, according to the embodiment of the present invention, regarding the pixels in the C area and the UC area of the interpolation frame, only in a case where a predetermined condition is satisfied, the computation for the pixel value is performed through the one-sided interpolation by using the compensation allocation vector. With reference to FIG. 13, the case where this predetermined condition is satisfied will be described.

FIG. 13 illustrates a moving image example where an object 222 is displayed, representing images of frames at four different times including the time t−1 to the time t+2. The vertical axis represents the time, and the horizontal axis represents the position of the image (pixel). The object 222 is moved in the right direction in the drawing along with the elapse of time, and also, the image of the background of the object 222 is moved in the left direction of the screen along with the elapse of time. In the same drawing, the arrows depicted by the dotted lines in the drawing represent the motion vectors detected by the method in the related art.

In the example of the same drawing, it is determined that the pixel 251 is the pixel in the UC area of the interpolation frame and also is the pixel in the UC area, and it is determined that a pixel 253 is the pixel in the C area of the interpolation frame and also is the pixel in the C area.

Now, it is assumed that the pixel 251 is allocated with a compensation allocation vector 271. The compensation allocation vector 271 is, for example, selected among the motion vectors respectively allocated to the pixels in the periphery of the pixel 251. Also, a pixel 252 is allocated with a compensation allocation vector 272. The compensation allocation vector 272 is, for example, selected among the motion vectors respectively allocated to the pixels in the periphery of the pixel 252.

According to the embodiment of the present invention, prior to the computation for the pixel value of the pixel 251 in the UC area, the present DFD, the past DFD, and the future DFD based on the compensation allocation vector 271 are computed. It should be noted that as the present DFD of the current situation, a sum of absolute differences between an area 222a of the frame at the time t and an area 261 of the frame at the time t+1 is computed. Also, as the past DFD, a sum of absolute differences between the area 222a of the frame at the time t and an area 222b of the frame at the time t−1 is computed. Furthermore, as the future DFD, a sum of absolute differences between the area 261 of the frame at the time t+1 and an area 262 of the frame at the time t+2 is computed.

Then, in a case where the future DFD is the smallest among the present DFD, the past DFD, and the future DFD computed on the basis of the compensation allocation vector 271, through the one-sided interpolation using the compensation allocation vector 271, the pixel value of the pixel 251 is computed. To be more specific, as it is determined that the pixel 251 is the pixel in the UC area, in the frame at the time t+1, the pixel value of the pixel associated with the pixel 251 by the compensation allocation vector 271 is set as the pixel value of the pixel 251 which is the target pixel.

In a case where the future DFD is not the smallest among the present DFD, the past DFD, and the future DFD computed on the basis of the compensation allocation vector 271, through the double-sided interpolation using the compensation allocation vector 271, the pixel value of the pixel 251 is computed.

Similarly, according to the embodiment of the present invention, prior to the computation for the pixel value of the pixel 252 in the C area, the present DFD, the past DFD, and the future DFD based on the compensation allocation vector 272 are computed. It should be noted that as the present DFD of the current situation, a sum of absolute differences between an area 263 of the frame at the time t and an area 222c of the frame at the time t+1 is computed. Also, as the past DFD, a sum of absolute differences between the area 263 of the frame at the time t and an area 264 of the frame at the time t−1 is computed. Furthermore, as the future DFD, a sum of absolute differences between the area 222c of the frame at the time t+1 and an area 222d of the frame at the time t+2 is computed.

Then, in a case where the past DFD is the smallest among the present DFD, the past DFD, and the future DFD computed on the basis of the compensation allocation vector 272, through the one-sided interpolation using the compensation allocation vector 272, the pixel value of the pixel 252 is computed. To be more specific, as it is determined that the pixel 252 is the pixel in the C area, in the frame at the time t, the pixel value of the pixel associated with the pixel 252 by the compensation allocation vector 272 is set as the pixel value of the pixel 252 which is the target pixel.

In a case where the past DFD is not the smallest among the present DFD, the past DFD, and the future DFD computed on the basis of the compensation allocation vector 272, through the double-sided interpolation using the compensation allocation vector 272, the pixel value of the pixel 252 is computed.

FIG. 14 is a block diagram of a configuration example of an image processing apparatus 300 according to an embodiment of the present invention.

The image processing apparatus 300 is configured, for example, to generate an image of the interpolation frame from an input image which is composed of moving images continuous in terms of time and output the image. As illustrated in FIG. 14, the image processing apparatus 300 is composed by including a vector detection unit 301, the vector allocation unit 302, the compensation allocation unit 321, the background vector extraction unit 322, an evaluation value calculation unit 323, a C/UC area determination unit 324, the interpolation method decision unit 325, and an interpolation frame generation unit 331.

The vector detection unit 301 is adapted to detect motion vectors in the respective pixels of the input image, for example, through the gradient method, the block matching method, or the like.

The vector allocation unit 302 is adapted to allocate the motion vectors detected by the vector detection unit 301 to the respective pixels of the image of the interpolation frame.

The compensation allocation unit 321 is adapted to perform the compensation of the motion vector (allocation) on the pixels to which the motion vector is not allocated by the vector allocation unit 302 among the pixels of the image of the interpolation frame. The compensation allocation unit 321 is adapted to compute, for example, the DFD for the respective motion vectors allocated to the pixels in the periphery of the target pixel where the motion vectors should be compensated, and allocate the motion vector whose DFD value is the smallest to the target pixel as the compensation allocation vector.

The background vector extraction unit 322 is adapted to extract background vector candidates in the following manner.

Herein, the background vector is assumed to be the motion vector for the image of the background of the interpolation frame including the target pixel. Also, in general, in the moving image, the object largely moving is displayed small with respect to the background in many cases, and it is estimated that a ratio of the image of the background in the entire relevant interpolation frame is large. Therefore, the background vector can be rephrased into the motion vector representing the dominant motion of the image of the relevant frame.

The background vector which is the motion vector representing the dominant motion of the image can be obtained, for example, on the basis of a histogram of the motion vectors allocated to all the pixels of the interpolation frame including the target pixel (also including the compensation allocation vector). For example, the motion vectors allocated to the respective pixels are respectively set as two-dimensional vectors (x, y), and the histograms of the motion vectors are calculated. Among the histograms, for example, a predetermined number of motion vectors having larger frequencies in descending order are extracted as the background vectors. With this configuration, among the motion vectors allocated to the respective pixels of the relevant interpolation frame, the motion vectors allocated to a larger number of pixels are extracted as the background vectors.

Therefore, while it is assumed that the motion vector representing the dominant motion of the image is the motion vector representing the motion of the background of the image, the background vector extraction unit 322 extracts the background vectors.

It should be noted that in the calculation for the histogram, in a case where the pixel at the starting point or the pixel at the ending point identified by the motion vector have low luminance, and also a difference of the luminance values with respect to the surrounding pixels is small (flat), it is preferable that the motion vector is not accumulated to the histogram. This is because that such a motion vector is considered to have a low reliability.

Also, in the extraction of the background vectors, the larger results of applying differentiation or integration on the histograms may be extracted in descending order. When the background vectors are extracted on the basis of the results of applying differentiation on the histograms, for example, focused extraction of the motion vectors of the pixel in a particular area in the frame as the background vectors is suppressed. Also, when the background vectors are extracted on the basis of the results of applying integration on the histograms, for example, extraction of the motion vectors which are significant points of the histogram as the background vector is suppressed.

Herein, the description has been given that the background vector is extracted as the dominant motion on the entire screen of one interpolation frame, but for example, the image of the interpolation frame may be divided into a plurality of blocks, the dominant motion may be extracted for each block, and the background vector corresponding to each block may be extracted.

The evaluation value calculation unit 323 is adopted, as described above with reference to FIG. 9, to calculate the present DFD, the past DFD, and the future DFD based on the background vector extracted by the background vector extraction unit 322, and calculate the DFD based on the compensation allocation vector allocated by the compensation allocation unit 321.

Herein, the description has been given of the case where the evaluation value calculation unit 323 calculates the DFD as the evaluation value for the motion vector such as the background vector or the compensation allocation vector, but an evaluation value different from the DFD may be calculated.

The C/UC area determination unit 324 compares the magnitudes of the four DFDs including the present DFD, the past DFD, and the future DFD based on the background vector, and the DFD based on the compensation allocation vector through the evaluation value calculation unit 323 to determine whether the target pixel is the pixel in the C area, the pixel in the UC area, or the pixel in the normal area.

As described above with reference to FIG. 13, for the target pixel determined as the pixel in the C area or the UC area by the C/UC area determination unit 324, the interpolation method decision unit 325 calculates the present DFD, the past DFD, and the future DFD based on the compensation allocation vector allocated by the compensation allocation unit 321, and compares the magnitudes of the three DFDs to decide the computation method for the pixel value of the target pixel through the double-sided interpolation or the one-sided interpolation. It should be noted that in a case where it is decided that the pixel value of the target pixel should be computed through the one-sided interpolation, on the basis of the determination result of the C/UC area determination unit 324, the one-sided interpolation from which one of the frame at the time t and the frame at the time t+1 is also decided.

The interpolation frame generation unit 331 is adapted to compute the target pixel of the pixel value of the interpolation frame on the basis of the method decided by the interpolation method decision unit 325. With this configuration, the respective pixels of the interpolation frame are generated, and the image of the interpolation frame is output.

Next, with reference to a flowchart of FIG. 15, an interpolation frame generation processing performed by the image processing apparatus 300 according to the embodiment of the present invention will be described.

In step S101, the vector detection unit 301 detects the motion vectors in the respective pixels of the input image, for example, through the gradient method, the block matching method, or the like.

In step S102, the vector allocation unit 302 allocates the motion vectors detected by the vector detection unit 301 to the respective pixels of the interpolation frame.

In step S103, the compensation allocation unit 321 performs the compensation of the motion vector (allocation) on the pixels to which the motion vector is not allocated by the vector allocation unit 302 among the pixels of the image of the interpolation frame. With this configuration, for example, the compensation allocation vectors are allocated to the pixel in the C area, the pixel in the UC area, and the like.

Figure 16:
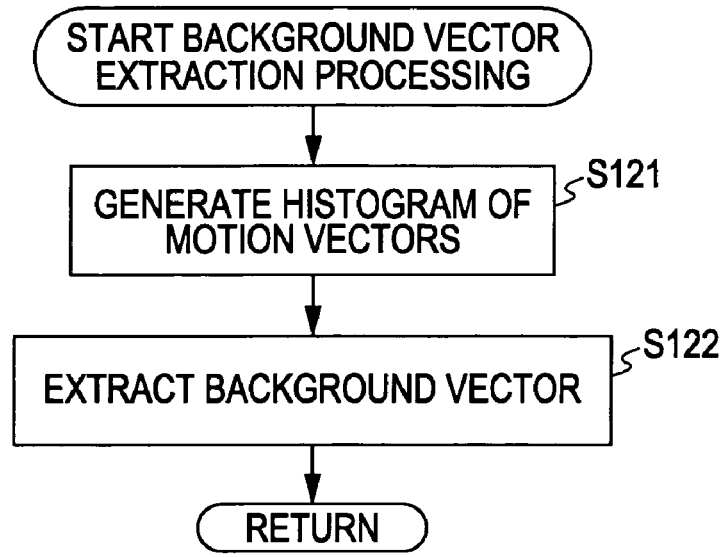
FIG. 16 is a flowchart for describing a background vector extraction processing.

In step S104, the background vector extraction unit 322 executes a background vector extraction processing which will be described below with reference to FIG. 16.

Herein, with reference to a flowchart of FIG. 16, a detail of the background vector extraction processing in step S104 of FIG. 15 will be described.

In step S121, the background vector extraction unit 322 calculates the histogram of the motion vectors while the motion vectors allocated to the respective pixels of the frame are, for example, respectively set as two-dimensional vectors (x, y).

In step S122, the background vector extraction unit 322 extracts a predetermined number of motion vectors having larger frequencies in descending order as the background vector among the histogram calculated through the processing in step S121, for example.

In this manner, the background vectors are extracted.

It should be noted that as described above, in the processing in step S122, the background vectors may be extracted in order of the larger results of applying differentiation or integration on the histograms.

Also, for example, the image of the frame may be divided into a plurality of blocks, the dominant motion may be extracted for each block, and the background vector corresponding to each block may be extracted.

While referring back to FIG. 15, after the processing in step S104, in step S105, the evaluation value calculation unit 323 and the C/UC area determination unit 324 executes an area determination processing which will be described below with reference to FIG. 17.

Herein, with reference to a flowchart of FIG. 17, a detail of the area determination processing in step S105 of FIG. 15 will be described. It should be noted that this processing corresponds to a processing in step S103 in the image of the interpolation frame where the pixels which are the targets of the compensation allocation are set as the target pixels, and the processing is executed on each of the target pixels.

In step S141, as described above with reference to FIG. 9, the evaluation value calculation unit 323 calculates the DFD based on the compensation allocation vector allocated by the compensation allocation unit 321.

In step S142, as described above with reference to FIG. 9, the evaluation value calculation unit 323 calculates the present DFD, the past DFD, and the future DFD based on the background vector extracted by the background vector extraction unit 322.

In step S143, the C/UC area determination unit 324 executes a comparison determination processing which will be described below with reference to FIG. 18. Herein, with reference to a flowchart of FIG. 18, a detail of the comparison determination processing in step S143 of FIG. 17 will be described.

In step S161, the C/UC area determination unit 324 compares the DFD based on the compensation allocation vector calculated in the processing in step S141 with the present DFD, the past DFD, and the future DFD based on the background vector calculated in the processing in step S142.

In step S162, the C/UC area determination unit 324 determines whether all the present DFD, the past DFD, and the future DFD based on the background vector calculated in the processing in step S142 are smaller than the previously set threshold.

In step S162, in a case where it is determined that all the present DFD, the past DFD, and the future DFD based on the background vector are smaller than the previously set threshold, the processing is advanced to step S164, and the C/UC area determination unit 324 determines the target pixel is the pixel in the normal area. In such a case, as described above with reference to FIG. 10, it is considered that the determination result for the area of the target pixel has a low reliability.

In step S162, in a case where it is determined that at least one of the DFDs among the present DFD, the past DFD, and the future DFD based on the background vector is not smaller than the threshold, the processing is advanced to step S163.

In step S163, as the result of the comparison in step S161, the C/UC area determination unit 324 determines the DFD based on the compensation allocation vector is the smallest among the DFD based on the compensation allocation vector calculated in processing in step S141, and the present DFD, the past DFD, and the future DFD based on the background vector calculated in the processing in step S142.

In step S163, in a case where it is determined that the DFD based on the compensation allocation vector is the smallest, the processing is advanced to step S164, and the C/UC area determination unit 324 determines that the target pixel is the pixel in the normal area.

In step S163, in a case where it is determined that the DFD based on the compensation allocation vector is not the smallest, the processing is advanced to step S165.

In step S165, as the result of the comparison in step S161, the C/UC area determination unit 324 determines whether the past DFD based on the background vector is the smallest among the DFD based on the compensation allocation vector calculated in processing in step S141, and the present DFD, the past DFD, and the future DFD based on the background vector calculated in the processing in step S142.

In step S165, in a case where it is determined that the past DFD based on the background vector, the processing is advanced to step S166, and the C/UC area determination unit 324 determines that the target pixel is the pixel in the C area.

In step S165, in a case where it is determined that the past DFD based on the background vector is not the smallest, the processing is advanced to step S167.

In step S167, as the result of the comparison in step S161, the C/UC area determination unit 324 determines whether the present DFD based on the background vector is the smallest among the DFD based on the compensation allocation vector calculated in processing in step S141, and the present DFD, the past DFD, and the future DFD based on the background vector calculated in the processing in step S142.

In step S167, in a case where it is determined that the present DFD based on the background vector is the smallest, the processing is advanced to step S168, and the C/UC area determination unit 324 determines that the target pixel is the pixel in the normal area.

In step S167, in a case where it is determined that the present DFD based on the background vector is not the smallest, the processing is advanced to step S169.

In step S169, as the result of the comparison in step S161, the C/UC area determination unit 324 determines whether the future DFD based on the background vector is the smallest among the DFD based on the compensation allocation vector calculated in processing in step S141, and the present DFD, the past DFD, and the future DFD based on the background vector calculated in the processing in step S142.

In step S169, in a case where it is determined that the future DFD based on the background vector is the smallest, the processing is advanced to step S170, and the C/UC area determination unit 324 determines that the target pixel is the pixel in the UC area.

In step S169, in a case where it is determined that the future DFD based on the background vector is not the smallest, the processing is advanced to step S171, and the error processing is executed. It should be noted that in a case where processings in steps S169 and S171 are omitted, and it is determined in step S167 that the present DFD is not the smallest, the processing is advanced to step S170, and it may be determined that the area of the target pixel is the UC area.

In this manner, the area of the target pixel is determined. It should be noted that the pixels which are not the targets of the compensation allocation in the processing in step S103 are all the pixels in the normal area. With this configuration, all the areas of the pixels of the interpolation frame are identified, and in a subsequent processing, the area of the target pixel is determined on the basis of the identification result.

Figure 17:
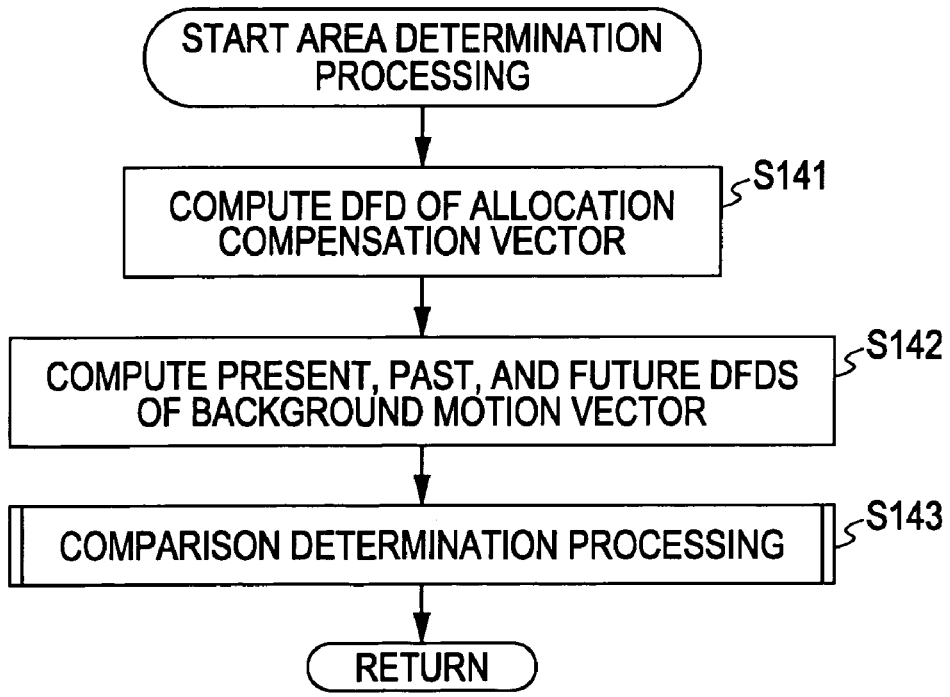
FIG. 17 is a flowchart for describing an area determination processing.
Figure 18:
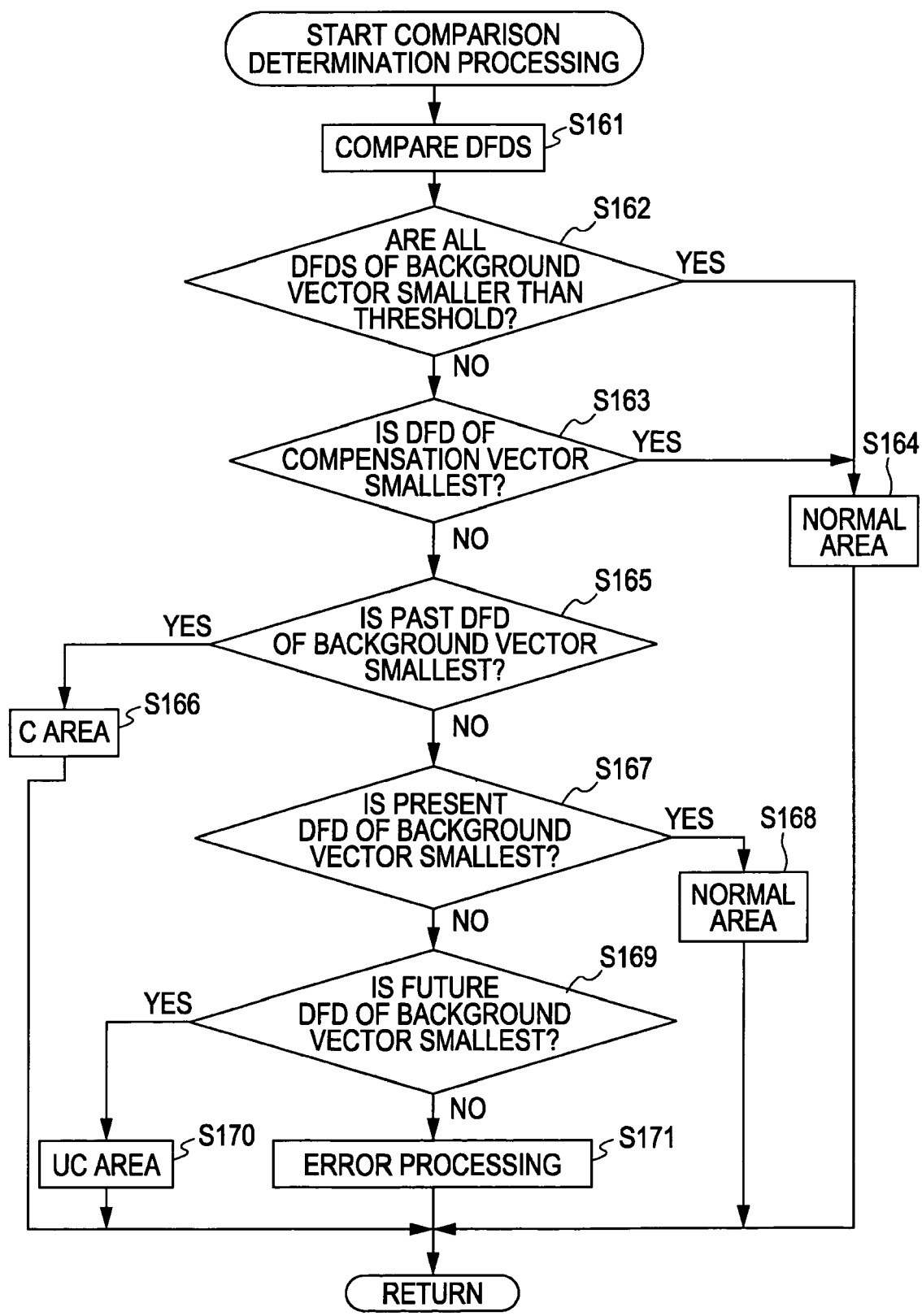
FIG. 18 is a flowchart for describing a comparison determination processing.

Along with the end of the comparison determination processing, the area determination processing of FIG. 17 is also ended, and the processing is advanced to step S106 of FIG. 15. In step S106, the interpolation method decision unit 325 executes a pixel generation method decision processing which will be described with reference to FIG. 19.

Figure 19:
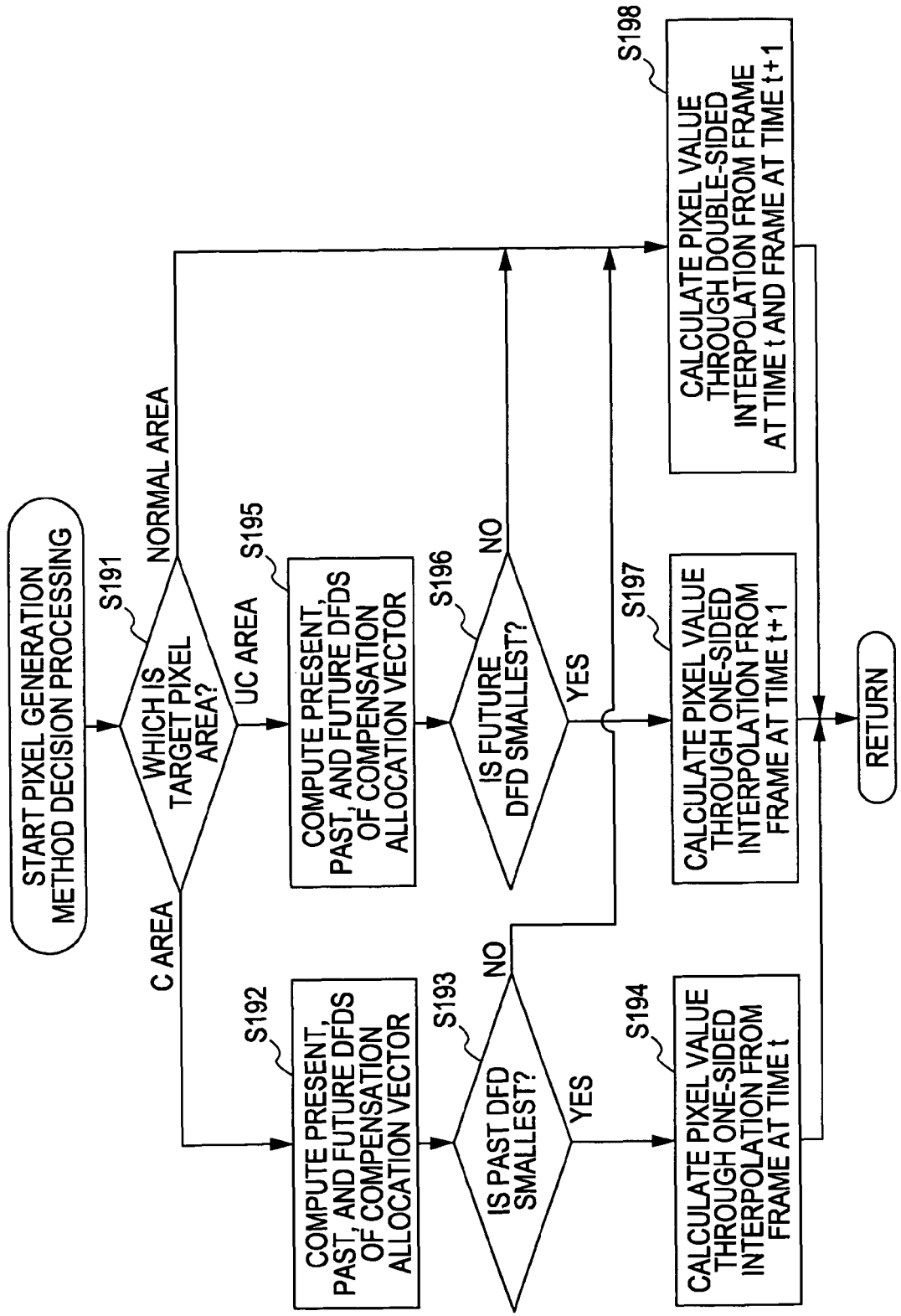
FIG. 19 is a flowchart for describing a pixel generation method decision processing.

Herein, with reference to a flowchart of FIG. 19, a detail of the pixel generation method decision processing in step S106 of will be described. This processing is executed on each of the target pixels while the respective pixels constituting the image of the interpolation frame are set as the target pixels.

In step S191, the interpolation method decision unit 325 determines the area of the target pixel. This determination is performed on the basis of the processing result in step S143. In step S191, in a case where it is determined that the target pixel is the pixel in the C area, the processing is advanced to step S192.

In step S192, for example, as described above with reference to FIG. 13, the interpolation method decision unit 325 computes the present DFD, the past DFD, and the future DFD based on the compensation allocation vector of the target pixel.

In step S193, the interpolation method decision unit 325 determines whether the past DFD is the smallest among the three DFDs computed in the processing in step S192. In a case where it is determined that the past DFD is the smallest, the processing is advanced to step S194.

In step S194, the interpolation method decision unit 325 decides the target pixel generation method while for the target pixel, the pixel value is calculated through the one-sided interpolation from the frame at the time t.

On the other hand, in step S191, in a case where it is determined that the target pixel is the pixel in the UC area, the processing is advanced to step S195.

In step S195, the interpolation method decision unit 325 computes the present DFD, the past DFD, and the future DFD based on the compensation allocation vector of the target pixel, for example, as described above with reference to FIG. 13.

In step S196, the interpolation method decision unit 325 determines whether the future DFD is the smallest among the three DFDs computed in the processing in step S195. In a case where it is determined that the future DFD is the smallest, the processing is advanced to step S197.

In step S197, the interpolation method decision unit 325 decides the target pixel generation method while for the target pixel, the pixel value is calculated through the one-sided interpolation from the frame at the time t+1.

In step S191, in a case where it is determined that the target pixel is the pixel in the normal area, the processing is advanced to step S198. In addition, in step S193, in a case where it is determined that the past DFD is not the smallest, and, in step S196, in a case where it is determined that the future DFD is not the smallest, the processing is also advanced to step S198.

In step S198, the interpolation method decision unit 325 decides the target pixel generation method while for the target pixel, the pixel value is calculated through the double-sided interpolation from the frame at the time t and the frame at the time t+1.

In this manner, the pixel generation method for each of the pixels constituting the image of the interpolation frame is decided.

While referring back to FIG. 15, after the processing in step S106, the processing is advanced to step S107. By computing the pixel value of the target pixel, the interpolation frame generation unit 331 generates the pixel of the interpolation frame. At this time, while following the method decided by the processing in step S194, S197, or S198 of FIG. 19, the pixel value is computed.

In this manner, the image of the interpolation frame is generated.

With this configuration, for example, also regarding the pixel in the C area or the UC area which is an area in the interpolation frame where the motion vector do not pass, it is possible to perform the generation of the interpolation frame in which the degradation of the image is suppressed. That is, in any area of the image of the interpolation frame, it is possible to generate the pixel appropriately.

It should be noted that the above-mentioned series of processing can be executed by using hardware, and also executed by using software. In a case where the above-mentioned series of processing is executed by using the software, a program constituting the software is installed from a network or a recording medium into a computer incorporated in dedicated-use hardware or into a general-use personal computer 700 illustrated, for example, in FIG. 20, which can execute various functions by installing various programs, or the like.

Figure 20:
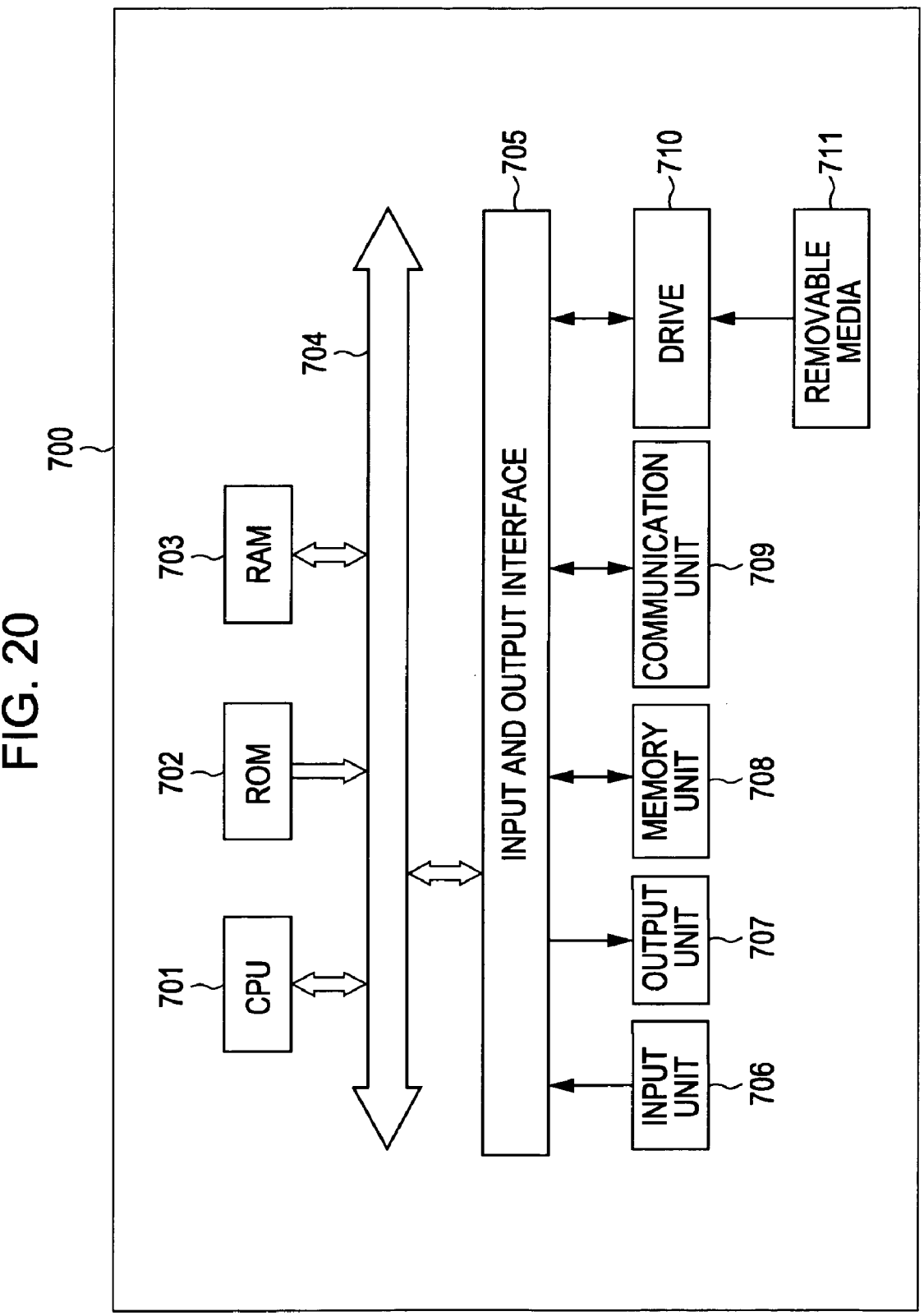
FIG. 20 a block diagram of a configuration example of a personal computer.

In FIG. 20, a CPU (Central Processing Unit) 701 executes various processings while following a program stored in a ROM (Read Only Memory) 702 or a program loaded from a storage unit 708 onto a RAM (Random Access Memory) 703. Also, the RAM 703 appropriately stores data and the like used by the CPU 701 to execute various processings.

The CPU 701, the ROM 702, and the RAM 703 are mutually connected via a bus 704. An input and output interface 705 is also connected to the bus 704.

To the input and output interface 705, an input unit 706 composed of a keyboard, a mouse, and the like, an output unit 707 composed of a display made by using a CRT (Cathode Ray Tube), a LCD (Liquid Crystal Display), or the like, and a speaker, etc., the storage unit 708 composed of a hard disk drive, and the like, a communication unit 709 composed of a modem, a network interface card such as a LAN card are connected. The communication unit 709 performs a communication processing via a network including the internet.

Also, a drive 710 is connected to the input and output interface 705 as occasion demands. Removal media 711 such as a magnetic disk, an optical disk, an opto-magnetic disk, or a semiconductor memory is appropriately mounted to the input and output interface 705 and the computer program read therefrom is installed into the storage unit 708 as occasion demands.

In a case where the above-mentioned series of processing is executed by using the software, a program constituting the software is installed from a network such as the internet or a recording medium such as the removal media 711.

It should be noted that this recording medium may be constructed by the removal media 711 composed of a magnetic disk (including Floppy disk (registered trademark)), an optical disk (including CD-ROM (Compact Disk-Read Only Memory) and DVD (Digital Versatile Disk)), an opto-magnetic disk (including MD (Mini-Disk) (registered trademark)), a semiconductor memory in which the program is recorded and which is distributed for delivering the program to the user in addition to the apparatus main body shown in FIG. 20, and also may be constructed by the ROM 702 in which the program is recorded to be delivered to the user in a state of being previously incorporated in the apparatus main body or the hard disk drive included in the storage unit 708.

It should be noted that the processing includes not only a case where the steps for executing the series of processing described above are performed in the present specification in the stated order in a time series manner, but also a case where the steps are performed in parallel or individually instead of being performed in the time series.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, the image processing apparatus comprising:
    a processor configured so as to:
    generate, on the basis of a first frame of time t of a moving image and a second frame of time t+1 of the moving image, an interpolation frame of the moving image which comes after the first frame in terms of time and comes before the second frame in terms of time, where the first frame and the second frame each include one or more corresponding pixels between the first frame and the second frame, the first frame includes a first pixel not having a corresponding pixel in the second frame and, the second frame includes a second pixel not having a corresponding pixel in the first frame;
    determine one or more interpolated pixels in the interpolation frame for the one or more corresponding pixels between the first frame and the second frame by allocating one or more motion vectors between respective ones of the one or more corresponding pixels of the first frame and the second frame;
    determine a first target pixel in the interpolation frame for the first pixel in the first frame not having a corresponding pixel in the second frame by determining a first background vector between the first pixel in the first frame and a first corresponding pixel in a third frame of time t−1 of the moving image which comes before the first frame in terms of time; and,
    determine a second target pixel in the interpolation frame for the second pixel in the second frame not having a corresponding pixel in the first frame by determining a second background vector between the second pixel in the second frame and a second corresponding pixel in a fourth frame of time t+2 of the moving image which comes after the second frame in terms of time.

2. The image processing apparatus of claim 1, wherein the processor is further configured to:
    determine a pixel value of the first target pixel and a pixel value of the second target pixel by computing a plurality of evaluation values for evaluating the reliability of the first background vector and the second background vector and comparing magnitudes of the plurality of evaluation values.

3. The image processing apparatus of claim 1, wherein the first background vector and the second background are determined on the basis of a histogram of the one or more motion vectors between respective ones of the one or more corresponding pixels of the first frame and the second frame.

4. The image processing apparatus according to claim 2, wherein the computed plurality of evaluation values include:
    a present DFD magnitude value computed based on the respective ones of the one or more corresponding pixels of the first frame and the second frame;
    a past DFD magnitude value computed based on the first pixel in the first frame not having a corresponding pixel in the second frame and the first corresponding pixel in the third frame which comes before the first frame in terms of time;
    a future DFD magnitude value computed based on the second pixel in the second frame not having a corresponding pixel in the first frame and the second corresponding pixel in the fourth frame which comes after the second frame in terms of time.

5. The image processing apparatus according to claim 4, wherein the processor is further configured to:
    determine that an area containing the first target pixel or the second target pixel in the interpolation frame is a covered area if the past DFD magnitude value is smallest of the evaluation values,
    determine that the area containing the first target pixel or the second target pixel in the interpolation frame is an uncovered area if the future DFD magnitude value is smallest of the evaluation values, and,
    determine that the area containing the first target pixel or the second target pixel in the interpolation frame is an normal area if the present DFD magnitude value is smallest of the evaluation values.

6. The image processing apparatus according to claim 4, wherein the processor is further configured to:
    set a value for the first target pixel in the interpolation frame to a value of the first pixel in the first frame not having a corresponding value in the second frame when it is determined that the past DFD magnitude value is smallest among the plurality of evaluation values;
    set a value for the second target pixel in the interpolation frame to a value of the second pixel in the second frame not having a corresponding value in the first frame when it is determined that the future DFD magnitude value is smallest among the plurality of evaluation values, and
    set values for the one or more interpolated pixels in the interpolation frame by interpolating between respective ones of the one or more corresponding pixels between the first frame and the second frame.

7. An image processing method, the method comprising:
    generating, on the basis of a first frame of time t of a moving image and a second frame of time t+1 of the moving image, an interpolation frame of the moving image which comes after the first frame in terms of time and comes before the second frame in terms of time, where the first frame and the second frame each include one or more corresponding pixels between the first frame and the second frame, the first frame includes a first pixel not having a corresponding pixel in the second frame and, the second frame includes a second pixel not having a corresponding pixel in the first frame;
    determining, using a processor, one or more interpolated pixels in the interpolation frame for the one or more corresponding pixels between the first frame and the second frame by allocating one or more motion vectors between respective ones of the one or more corresponding pixels of the first frame and the second frame;
    determining, using the processor, a first target pixel in the interpolation frame for the first pixel in the first frame not having a corresponding pixel in the second frame by determining a first background vector between the first pixel in the first frame and a first corresponding pixel in a third frame of time t−1 of the moving image which comes before the first frame in terms of time; and,
    determining, using the processor, a second target pixel in the interpolation frame for the second pixel in the second frame not having a corresponding pixel in the first frame by determining a second background vector between the second pixel in the second frame and a second corresponding pixel in a fourth frame of time t+2 of the moving image which comes after the second frame in terms of time.

8. A non-transitory computer-storage medium including one or more instructions executable by a processor, the one or more instructions, when executed by the processor, configuring the processor to:

generate, on the basis of a first frame of time t of a moving image and a second frame of time t+1 of the moving image, an interpolation frame of the moving image which comes after the first frame in terms of time and comes before the second frame in terms of time, where the first frame and the second frame each include one or more corresponding pixels between the first frame and the second frame, the first frame includes a first pixel not having a corresponding pixel in the second frame and, the second frame includes a second pixel not having a corresponding pixel in the first frame;

determine one or more interpolated pixels in the interpolation frame for the one or more corresponding pixels between the first frame and the second frame by allocating one or more motion vectors between respective ones of the one or more corresponding pixels of the first frame and the second frame;

determine a first target pixel in the interpolation frame for the first pixel in the first frame not having a corresponding pixel in the second frame by determining a first background vector between the first pixel in the first frame and a first corresponding pixel in a third frame of time t−1 of the moving image which comes before the first frame in terms of time; and, determine a second target pixel in the interpolation frame for the second pixel in the second frame not having a corresponding pixel in the first frame by determining a second background vector between the second pixel in the second frame and a second corresponding pixel in a fourth frame of time t+2 of the moving image which comes after the second frame in terms of time.

* * * * *